(12) United States Patent
Hamaker

(10) Patent No.: US 10,545,868 B2
(45) Date of Patent: Jan. 28, 2020

(54) MANAGING DISPLAY DATA

(71) Applicant: Eric Kenneth Hamaker, Cambridge (GB)

(72) Inventor: Eric Kenneth Hamaker, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/766,329

(22) PCT Filed: Sep. 28, 2016

(86) PCT No.: PCT/GB2016/053022
§ 371 (c)(1),
(2) Date: Apr. 5, 2018

(87) PCT Pub. No.: WO2017/060678
PCT Pub. Date: Apr. 13, 2017

(65) Prior Publication Data
US 2019/0121735 A1      Apr. 25, 2019

(30) Foreign Application Priority Data

Oct. 6, 2015   (GB) .................................. 1517647.2

(51) Int. Cl.
*G09G 5/36*       (2006.01)
*G06F 12/0802*    (2016.01)
(Continued)

(52) U.S. Cl.
CPC ........ *G06F 12/0802* (2013.01); *G06F 3/1415* (2013.01); *G06F 12/0875* (2013.01);
(Continued)

(58) Field of Classification Search
CPC . G06T 1/60; G06T 2207/20021; G06T 7/254; G09G 5/393; G09G 2320/103;
(Continued)

(56) References Cited

U.S. PATENT DOCUMENTS 7,626,588 B1   12/2009  Molnar et al.
2003/0058248 A1  3/2003  Hochmuth et al.
(Continued)

FOREIGN PATENT DOCUMENTS

WO    WO 2008/092104    7/2008

*Primary Examiner* — Hau H Nguyen
(74) *Attorney, Agent, or Firm* — Haynes and Boone, LLP

(57) ABSTRACT

A method of managing display data involves maintaining caches (25, 29) of most recently used tiles of display data at a host (21) and at a display control device (22). The caches (25, 29) are synchronised so that they contain the same data in the same locations. When the host (21) generates a tile that needs encoding and transmitting, it checks to see if that tile is already stored in the host cache (25). If so, it sends a cache ID to the display control device (22); otherwise, it encodes and sends the tile. When the display control device (22) receives data, it identifies it either as a cache ID or as an encoded tile. If it is a cache ID, the data is retrieved from the display control device cache (29) and sent for display (23); otherwise, it decodes the tile and sends it for display (23). Both caches (25, 29) are updated so that the tile is indicated as the most recently accessed item in each cache (25, 29).

37 Claims, 15 Drawing Sheets

(51) Int. Cl.
   *G06T 1/60* (2006.01)
   *G06F 12/0875* (2016.01)
   *G06F 3/14* (2006.01)
   *G09G 5/00* (2006.01)

(52) U.S. Cl.
   CPC ............... *G06T 1/60* (2013.01); *G09G 5/003* (2013.01); *G09G 2320/103* (2013.01); *G09G 2350/00* (2013.01); *G09G 2360/12* (2013.01); *G09G 2360/121* (2013.01); *G09G 2360/122* (2013.01)

(58) Field of Classification Search
   CPC ............... G09G 5/395; G09G 2310/04; G09G 2360/121; G09G 2360/122; G09G 2360/127; G06F 3/1462; G06F 3/1415
   See application file for complete search history.

(56) References Cited

U.S. PATENT DOCUMENTS

| | | | |
|---|---|---|---|
| 2004/0008214 A1 | 1/2004 | O'Neill et al. | |
| 2008/0002894 A1 | 1/2008 | Hayon et al. | |
| 2009/0083512 A1 | 3/2009 | Godwin et al. | |
| 2009/0307428 A1 | 12/2009 | Schmieder et al. | |
| 2011/0074800 A1* | 3/2011 | Stevens | G06T 11/40 345/545 |
| 2011/0080419 A1* | 4/2011 | Croxford | G09G 5/393 345/531 |
| 2014/0354664 A1 | 12/2014 | Brown | |
| 2015/0278981 A1 | 10/2015 | Akenine-Moller | |

* cited by examiner

MANAGING DISPLAY DATA

CROSS-REFERENCE TO RELATED APPLICATIONS

This application is a U.S. national stage application under 35 U.S.C. § 371 of International Patent Application No. PCT/GB2016/053022, filed on Sep. 28, 2016, which claims the benefit of Great Britain Patent Application No. 1517647.2 filed on Oct. 6, 2015, the contents of each of which are incorporated herein by reference in their entirety.

BACKGROUND

Conventionally, when display data is produced by a computing device for display on one or more connected display devices, it is stored in memory in frames. A frame is a collection of display data stored in a dedicated area of memory known as a frame buffer, organised such that it can be read and rastered directly onto the display device, normally pixel by pixel on a line-by-line basis, with the data from one complete frame providing the display data of one complete image screen on the display device. The data contained in a frame buffer may be arranged and processed as a number of tiles, where each tile is formed of one or more pixels, or as a number of tile groups, where each tile group is a collection of one or more tiles.

Commonly, there will be multiple frame buffers is use at any one time, arranged such that one frame buffer is being read and displayed while a second frame buffer is being written to. This prevents the distortion and visual artefacts known as tearing, caused by the reading process getting ahead of the writing process and beginning to read and display old data.

It is common for there to be considerable repetition both between and within frames. For example, if the user is viewing a web page or document that is predominantly a single colour and typing new text into it, there will be significant repetition of the single colour within the frame and the only difference between the frames will be the new text.

There currently exist methods of comparing consecutive frames in order to find areas of data that do not change from frame to frame. Once the data that has not changed has been determined, that can be used during the data compression process to reduce the amount of data required. Nevertheless, a complete frame buffer needs to be populated in order to provide the data for rastering and displaying on a screen.

The conventional method of preparing whole frame buffers is also inefficient because it requires large areas of memory to be dedicated to the storage of frames, and the memory required increases as the size and resolution of display devices increases and as users connect an increasing number of display devices to the same computing device, which is commonly known as a host. These large areas of memory must then be read from external memory to local memory within the display output chip, even if the data is redundant. Such data transfers are slow and this therefore increases latency and bandwidth and power use between the production of display data and its display.

Aspects of the invention seek to solve or at least mitigate these problems.

BRIEF SUMMARY OF THE INVENTION

Accordingly, in a first aspect, the invention provides a method of managing display data, the method comprising, at a host device:

receiving display data for a frame to be displayed on a display device, the frame of display data being divided into a plurality of tiles, where each tile is formed of display data for a plurality of pixels to be displayed in the display device as a single frame;

determining a tile identification of a tile, the tile identification including a location of the tile within the frame to be displayed;

determining whether a representation of the display data of the tile matches, within a predetermined threshold, a representation of display data of one or more tiles stored in a cache memory;

if the representation of the display data of the tile matches the representation of display data of a stored tile:
  determining a match identification of the matching stored tile in the cache memory;
  associating the tile identification with the match identification; and
  transmitting the tile identification and the associated match identification for the tile to a display control device; and if the representation of the display data of the tile does not match the representation of display data of any of the stored tiles:
  transmitting the tile identification and the display data for the tile to the display control device.

According to a second aspect, the invention provides a method of managing display data, the method comprising, at a host device:

receiving display data for a frame to be displayed on a display device, the frame of display data being divided into a plurality of tiles, where each tile is formed of display data for a plurality of pixels to be displayed in the display device as a single frame;

determining a tile identification of a tile, the tile identification including a location of the tile within the frame to be displayed;

determining whether a representation of the display data of the tile matches, within a predetermined threshold, a representation of display data of one or more tiles stored in a cache memory;

if the representation of the display data of the tile matches the representation of display data of a stored tile:
  determining a match identification of the matching stored tile in the cache memory;
  associating the tile identification with the match identification; and
  transmitting the tile identification and the associated match identification for the tile to a display control device; and if the representation of the display data of the tile does not match the representation of display data of any of the stored tiles:
  comparing the tile with a corresponding tile at a corresponding location in a previous frame to determine whether the tile is changed or unchanged compared to the corresponding tile;
  if the tile is unchanged, sending to the display control device the tile identification and instructions to use the display data of the corresponding tile; and
  if the tile is changed, transmitting the tile identification and the display data for the tile to the display control device.

In a third aspect, the invention provides a method of managing display data, the method comprising, at a host device:

receiving display data for a frame to be displayed on a display device, the frame of display data being divided into a plurality of tiles, where each tile is formed of display data for a plurality of pixels to be displayed in the display device as a single frame;

determining a tile identification of a tile, the tile identification including a location of the tile within the frame to be displayed;

comparing the tile with a corresponding tile at a corresponding location in a previous frame to determine whether the tile is changed or unchanged compared to the corresponding tile;

if the tile is unchanged, sending to the display control device the tile identification and instructions to use the display data of the corresponding tile;

wherein at least one tile is changed, and for each changed tile:

determining whether a representation of the display data of the tile matches, within a predetermined threshold, a representation of display data of one or more tiles stored in a cache memory; and if the representation of the display data of the tile matches the representation of display data of a stored tile:

determining a match identification of the matching stored tile in the cache memory;

associating the tile identification of the tile with the match identification; and transmitting the tile identification of the tile and the associated match identification for the tile to a display control device; and if the representation of the display data of the tile does not match the representation of display data of any of the stored tiles, transmitting the tile identification of the tile and the display data for the tile to the display control device.

In a preferred embodiment, the match identification includes a location of the stored tile within the cache memory. Preferably, the method further comprises synchronizing the cache memory with a cache memory at the display control device.

In one embodiment, if the representation of the display data of the tile does not match the representation of display data of any of the stored tiles, storing the representation of the display data of the tile in the cache memory.

The method may further comprise determining whether the representation of the display data is to be locally stored, and, if it is determined that the representation of the display data is to be locally stored, then storing the representation of the display data of the tile in the cache memory. In an embodiment, storing the representation of the display data comprises determining a location for the storage of the representation of the display data of the tile within the cache memory. Preferably, the method further comprises transmitting the location for the storage of the representation of the display data of the tile to the display control device.

The representation of the display data may comprises one or more of: the display data; a hash of the display data resulting from performing a hash function on the display data; a cyclic redundancy check, CRC, value resulting from a CRC operation performed on the display data; or any other compressed form of the display data that can uniquely identify the display data.

In one embodiment, transmitting the display data to the display control device may comprise encoding the display data and transmitting the encoded display data to the display control device.

In a further aspect, the invention provides a method of managing display data, the method comprising, at a display control device:

receiving from a host device, information regarding display data for a frame to be displayed on a display device, the frame of display data being divided into a plurality of tiles, where each tile is formed of display data for a plurality of pixels to be displayed in the display device as a single frame, wherein the information comprises, for each tile, either:

a tile identification and an associated match identification for the tile, the tile identification including a location of the tile within the frame to be displayed and the match identification identifying a stored tile in a cache memory at the display control device; or the tile identification and the display data for the tile;

wherein, if the information comprises the tile identification and an associated match identification for the tile, the method further comprising:

identifying a stored tile in the cache memory from the associated match identification;

retrieving display data of the stored tile from the cache memory or from a local memory based on a pointer retrieved from the cache memory; and controlling the display device to display the display data of the stored tile at the location in the tile identification; or if the information comprises the tile identification and the display data for the tile, the method further comprising:

storing the display data of the tile in the cache memory as a stored tile or at a location in a local memory with a pointer to the location in the local memory being stored in the cache memory; and controlling the display device to display the display data at the location in the tile identification.

According to a still further aspect, the invention provides a method of managing display data, the method comprising, at a display control device:

receiving from a host device, information regarding display data for a frame to be displayed on a display device, the frame of display data being divided into a plurality of tiles, where each tile is formed of display data for a plurality of pixels to be displayed in the display device as a single frame, wherein the information comprises, for each tile, either:

a tile identification and an associated match identification for the tile, the tile identification including a location of the tile within the frame to be displayed and the match identification identifying a stored tile in a cache memory at the display control device;

the tile identification and instructions to re-use display data of a corresponding tile at a corresponding location in a previous frame; or the tile identification and the display data for the tile;

wherein, if the information comprises the tile identification and an associated match identification for the tile, the method further comprising:

identifying a stored tile in the cache memory from the associated match identification;

retrieving display data of the stored tile from the cache memory or from a local memory based on a pointer retrieved from the cache memory; and controlling the display device to display the display data of the stored tile at the location in the tile identification; or if the information comprises the tile identification and the instructions to re-use display data of a corresponding tile at a corresponding location in a previous frame, the method further comprises:
  identifying the corresponding tile at the corresponding location in the previous frame; and
  controlling the display device to display the display data of the corresponding tile at the location in the tile identification; or
if the information comprises the tile identification and the display data for the tile, the method further comprising:
  storing the display data of the tile in the cache memory as a stored tile or at a location in a local memory with a pointer to the location in the local memory being stored in the cache memory; and
  controlling the display device to display the display data of the stored tile at the location in the tile identification.

In one embodiment, the match identification includes a location of the stored tile within the cache memory.

Preferably, the method further comprises synchronizing the cache memory with a cache memory at the host device.

Preferably, a location in the cache memory where the display data of the tile is stored is determined and associated with a location of the stored tile in a cache memory of the host device. In an embodiment, the display data is stored in compressed form.

One embodiment of the invention comprises a method that involves the use of caching and comprises:
1. Maintaining caches of the most recently used tiles of display data at the host and the display control device;
2. Synchronising the caches so that they always contain the same data in the same locations;
3. When the host generates a tile that needs encoding and transmitting, checking to see if it is already stored in the host cache;
   a. If so, sending a cache ID to the display control device;
   b. Otherwise, encoding and sending the tile;
4. When the display control device receives data, identifying it as a cache ID or an encoded tile
   a. If it is a cache ID, retrieving data from the display control device cache and sending it for display
   b. Otherwise, decoding the tile and sending it for display
5. Updating both caches so that the tile is indicated as the most recently accessed item in each cache.

The provision of this method is beneficial because it reduces the need to repeatedly encode and transmit the same tile from the host to the display control device. This saves processing power and the bandwidth required to supply a complete frame to the display. Because encoding is not required and less data is being transmitted, the complete frame will be transmitted more quickly, which results in faster reaction times between the production of data and its display.

Preferably, instead of storing the full tile data in the cache at the host, a representation of the data may be stored that uniquely identifies the data, such as the result of a hashing function. This is beneficial because the representation of the data is likely to require less memory for storage, but is still sufficient to find the presence and location of a tile in the cache.

Preferably, the method further includes a method of comparing an incoming tile with the tile in the corresponding position in the previous frame, comprising:

1. Storing the previous frame as well as the aforementioned caches at the host and display control device, in such a manner that it is possible to access tiles by their location in the previous frame;
2. The host comparing each new tile with the tile at the corresponding position in the previous frame
3. If the new tile is the same as the tile at the corresponding position in the previous frame, the host sending a signal to the display control device telling it to re-use the same tile in the new frame.
4. Otherwise, continuing as hereinbefore described
5. At the display control device:
   a. Receiving the signal indicating that the same tile should be re-used
   b. Copying the tile at the appropriate location into the new frame This is beneficial because it further reduces data that must be sent from the host to the display control device and removes the need for cache interactions, further reducing latency.

The signal is preferably a tile ID, as this will make it easier for the appropriate tile in the previous frame to be located and copied if appropriate.

Preferably, the previous frame is stored in the form of unique derivatives for each tile, as hereinbefore described. This will also have the benefit of reducing the amount of memory space needed to store the previous frame.

Multiple display devices may be connected to a single display control device, and in this case there may be a method whereby the same cache can be used for multiple frames held at the same time in the display control device and displayed on different display devices. An example of this is where there is a single display device connected to the display control device and the connected host supports 'flicking between' different stored views, such views may also be stored on the display control device as frames using the same cache. This will be especially beneficial where the user is viewing or 'flicking between' similar views such as desktops with different icons or word processing documents. It will also mean that a display control device can supply display data to multiple display devices or views without needing to provide multiple caches.

Advantageously, the host may perform an entropy check on the data in the tile to see if it has entropy above a certain threshold. If so, it is unlikely that the tile will be repeated and therefore the host may determine that it should bypass the cache. In this case, the tile will be encoded and transmitted in the conventional way. The display control device may then perform a similar entropy check in order to determine that it should bypass its own cache, or the host may send the Tile with a flag to indicate the high entropy, in which case the display control device may automatically bypass the cache. This is beneficial because it avoids the problem of the entire cache being taken up with detailed Tiles that are unlikely to be repeated and will therefore gain no benefit from caching behaviour.

Another preferred method involves storing unique individual tiles at the display control device and comprises:
1. Maintaining a frame list at the display control device;
2. Maintaining a lookup table containing tiles and the address in memory where each tile is stored;
3. Upon receiving a tile;
   a. Checking if the tile has been previously seen
      i. If so, discarding the new tile
      ii. If not, storing the tile in memory and updating the lookup table appropriately 4. Inserting a pointer to the location of the tile in memory in the appropriate place in the frame list.

This is beneficial because it reduces the amount of memory space required to store a frame at the display control device. Although the tiles must still be stored, repeated tiles within a frame do not need to be duplicated as the frame list can simply store the same pointer repeatedly. This will require significantly less memory space than the full tile. It will also reduce bandwidth, latency, and required processing, as fewer writes to and reads from memory are required; if a tile is already in memory, a pointer to it can be copied rather than a duplicate needing to be written to memory as is currently necessary. This is especially beneficial if there is a system cache between some external memory and the display output as a unique tile need only be loaded into the system cache once and accessed repeatedly.

Preferably, instead of storing the full tile data in the lookup table, a derivative of the data may be stored that uniquely identifies the data, such as the result of a hashing function. This is beneficial because the representation of the data is likely to require less memory for storage, but is still sufficient to confirm the presence of a tile in the lookup table and thereby its corresponding memory address.

A further preferred method may involves both caching and tile-based storage, where this method comprises:
1. Maintaining caches and a frame list;
2. The host receiving a tile and checking its cache, then sending either an encoded tile or a cache ID;
3. The display control device receiving data and identifying it as either an encoded tile or a cache ID;
   a. If it is a cache ID, retrieving data from the display control device cache and using this to update the frame list with the appropriate pointer to memory (preferably, the cache stores pointers in the appropriate slots in the cache);
   b. If it is an encoded tile, checking if it has previously been seen;
      i. If so, discarding it and updating the frame list with the previously-generated pointer;
      ii. If not, storing it in memory and updating the frame list with the new pointer;
4. The devices updating their caches as previously described.

This is beneficial because it maximises the efficiency of the transmission and storage of tiles, making use of the method of storing tiles individually in memory in combination with the cache to minimise repetition as much as possible and thereby save space, time and bandwidth.

The host may perform an entropy check on the data in the Tile to see if it has entropy above a certain threshold and, if so, bypass the cache and encode and transmit the Tile in the conventional way. The display control device will also bypass the cache as previously described, but will store the Tile in memory as appropriate. The display control device may advantageously have a method of advanced garbage collection whereby Tiles with high entropy may be removed from memory and the lookup table more frequently than Tiles with low entropy.

BRIEF DESCRIPTION OF THE DRAWINGS

Embodiments of the invention will now be more fully described, by way of example, with reference to the drawings, of which.

DETAILED DESCRIPTION OF THE DRAWINGS

In the description below, the following terms have the following meanings:
   Cache ID: a reference to a tile's position in a cache, for example the third position from the front of an array, or the key of a lookup table.
   Tile ID: a reference to a tile's position in a frame, for example a row/column reference.
   Frame list: a list of pointers to memory locations such that each pointer is associated with a location in a frame and each memory location contains a tile.
   Display control device: a device placed between the host and the display device for processing display data and forming frames which may be either a separate device or incorporated into a display device.

Figure 1:
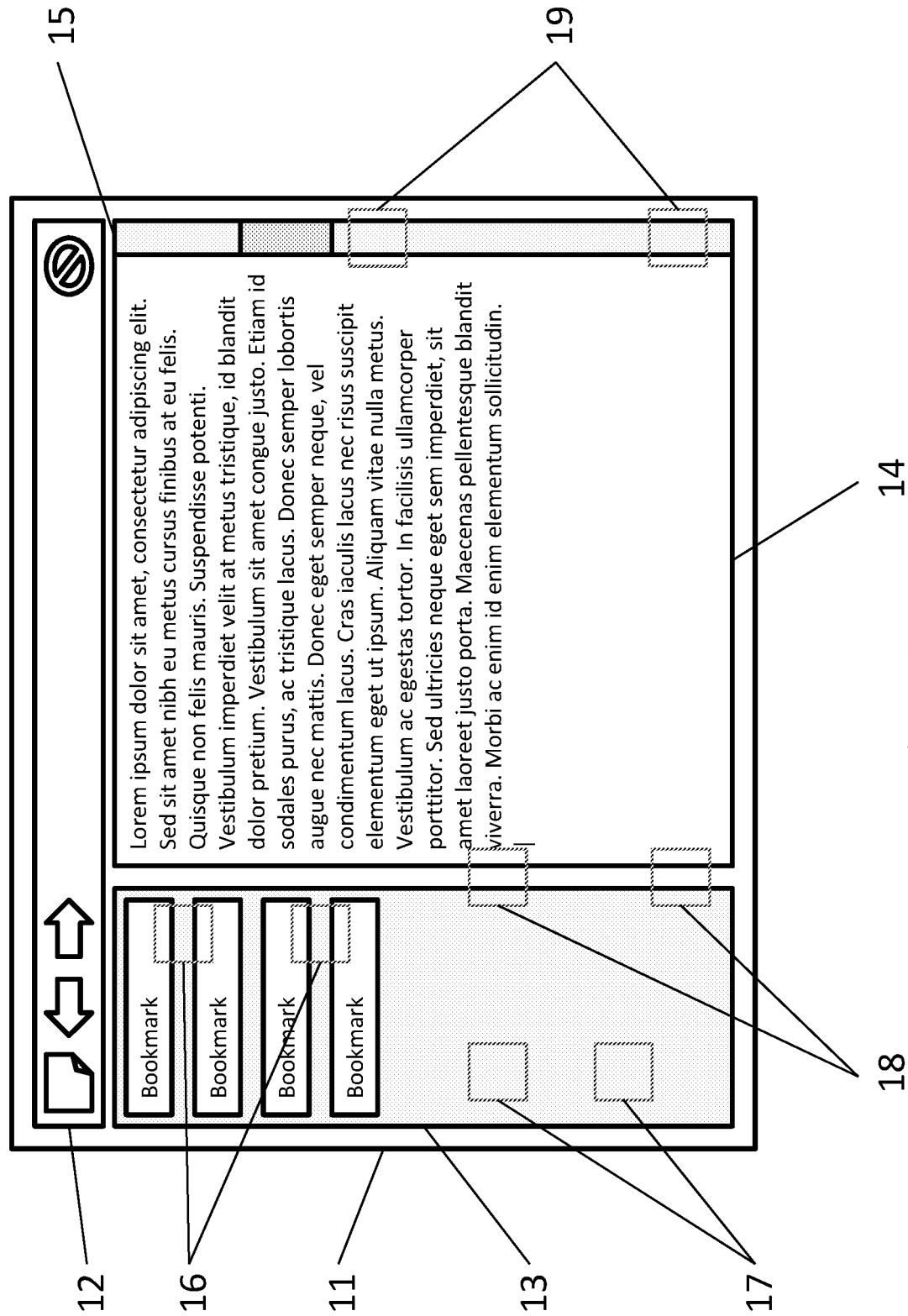
FIG. 1 is an example of a desktop image, showing areas of redundancy.

FIG. 1 shows an example of a desktop image [11] comprising a menu bar [12] with several icons, a navigation pane [13] with a number of buttons that act as bookmarks to parts of a document, an area of text [14], and a scroll bar [15]. There are significant areas of the same colour within the image [11], such as the white page below the text [14] and the grey background of the navigation pane [13], the latter being shown by the two highlight squares [17]. Further highlight squares [16, 18, 19] show examples of identical tiles that are not a single colour.

These areas [16, 17, 18, 19] and others like them are examples of redundancy. Conventionally, the entire image [11] would be sent from a host to a display control device, and this might be problematic where bandwidth availability is limited. It then also has to be stored prior to being sent to a display device, and because of the large number of tiles that are identical [16, 17, 18, 19], there is significant unnecessary duplication in storage.

If the host and display control device are using entropy checking, the text itself is an example of a collection of tiles that are likely to have high entropy; it is unlikely that any tile containing some letters and some white space will be repeated, especially if the tiles do not line up with specific words in isolation. In this case redundancy is unlikely to be an issue and it may be beneficial not to use the methods of the invention on this specific area of the image [11] while still using it on other areas with lower entropy and therefore a higher likelihood of redundancy. Although this is possible in some embodiments of the invention, for simplicity the processes described below do not use entropy checking. Nonetheless, it will be mentioned where such checking would be appropriate.

Figure 2:
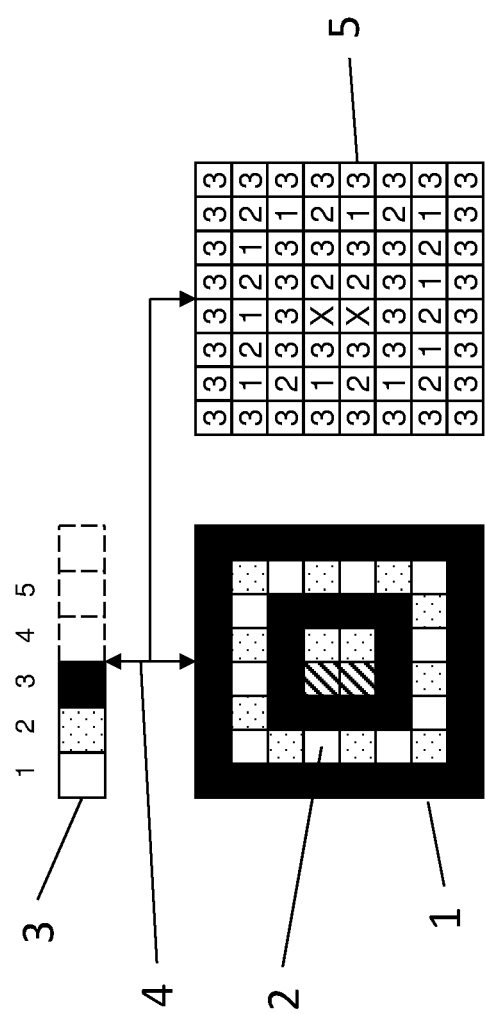
FIG. 2 shows, in schematic form, one embodiment of the invention.

Therefore, with reference to FIG. 2, in one embodiment of the invention, an frame 1, which forms a particular image for display, is divided into a number of tiles 2 (in this case 8×8 tiles), each of which is formed of a number of pixels. Each tile 2 has a particular tile ID indicating its location in the frame and the tile is compared with tiles that are stored in a cache memory 3. The comparison is illustrated by arrow 4 and the result is shown in frame 5. If a tile matches a tile in the cache memory 3, then it is replaced by the cache ID of that tile in the cache memory. Thus, as shown, the "black" tiles match the "black" tile stored at location "3" in the cache memory, and are replaced by that cache ID, the "white" tiles match the "white" tile stored at location "1" in the cache memory, and are replaced by that cache ID, and the "dotted" tiles match the "dotted" tile stored at location "2" in the cache memory, and are replaced by that cache ID. The two "diagonally-shaded" tiles in the frame 1 do not match any of the tiles in the cache memory and are marked as not found ("X"). Instead of sending the display data, then for each tile in the frame 1, only the display data for the "diagonally-shaded" tiles is sent to a display control device for display. For all the other tiles, only their cache ID needs to be sent, and the display control device, which has a similar cache memory, with the display data for the "black", "white" and "dotted" tiles stored with the same cache ID's, simply takes that display data from that matching cache ID for the appropriate tile and uses that for display.

In order to make sure that the cache memory in the display control device and in the host device have the same display data with the same cache IDs, the caches may be synchronized by sending information from one to the other. Alternatively, the way of populating the cache memories may be the same at both the host device and the display control device so that both have the same tile display data with the same cache IDs. For example, when a new frame is received, with new display data, the cache memory may be cleansed of all its display data from previous frames, or the old display data may simply be overwritten by new display data. When a first tile is checked and it is found that it does not match any tile already in the cache memory, the display data for that tile may be stored in the cache memory and a particular cache ID given to that stored tile. Thereafter, more tiles can be used to populate the cache memory as "new" tiles that do not match any already in the cache memory are received. If desired, some tiles may be flagged as ones that should not be stored in the cache memory, for example if they are unique or rare, so they are unlikely to match any (or only a small number) of later tiles. Furthermore, once all the space for storing tiles in the cache memory has been used, new tiles to be stored can overwrite already stored tiles. Such overwriting can be done according to the "age" of stored tiles, i.e. to overwrite the oldest ones first, or according to how may matches a tile makes, i.e. to overwrite the rarest matching tiles first. In both cases, some sort of counter to determine the age, or the number of matches, may need to be provided. Of course, some other algorithm for determining which tiles to overwrite could alternatively be used. Provided the same algorithm is used at the display control device, then the cache memories will have the same tiles with the same cache IDs.

Figure 3:
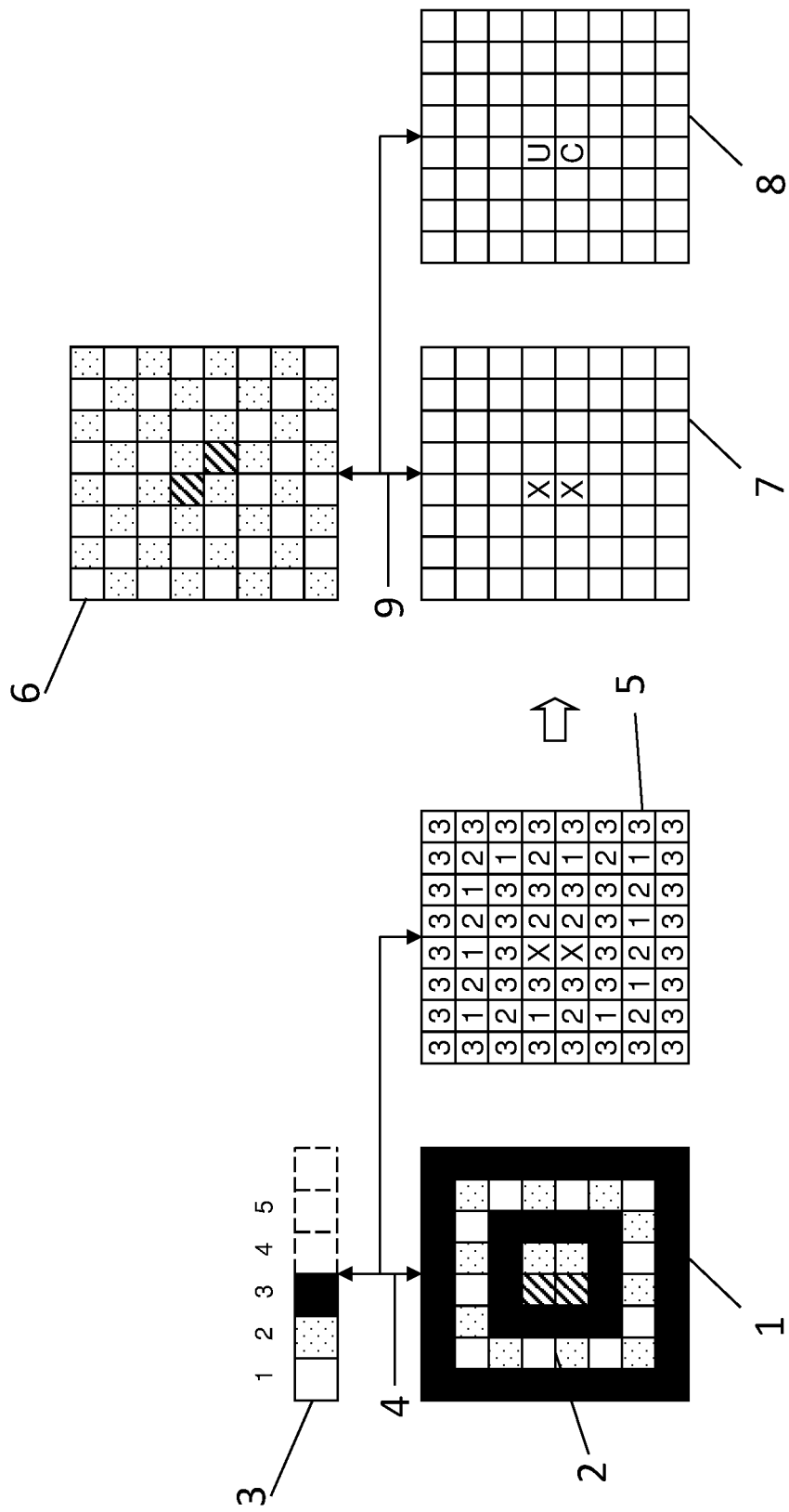
FIG. 3 shows, in schematic form, an extension of the embodiment of FIG. 2.

FIG. 3 shows a first extension to the method described above with reference to FIG. 2. In this case, when the tiles that do not match (marked with an "X") are determined (shown in frame 7), instead of sending the display data for these tiles to the display control device, they are first compared (shown by arrow 9) to the corresponding tile, at the same location, in a previous frame 6. As shown in FIG. 3, one of the two "diagonally-shaded" tiles is unchanged from the corresponding tile in the previous frame 6, whereas one of the tiles has changed (marked "U" and "C", respectively, in frame 8). In this case, the display data for the changed tile is sent to the display control device, as before, but for the unchanged tile, only an instruction that the display data for that tile is unchanged, so that the display control device can re-use (or not update) the display data for that tile from the previous frame.

Figure 4:
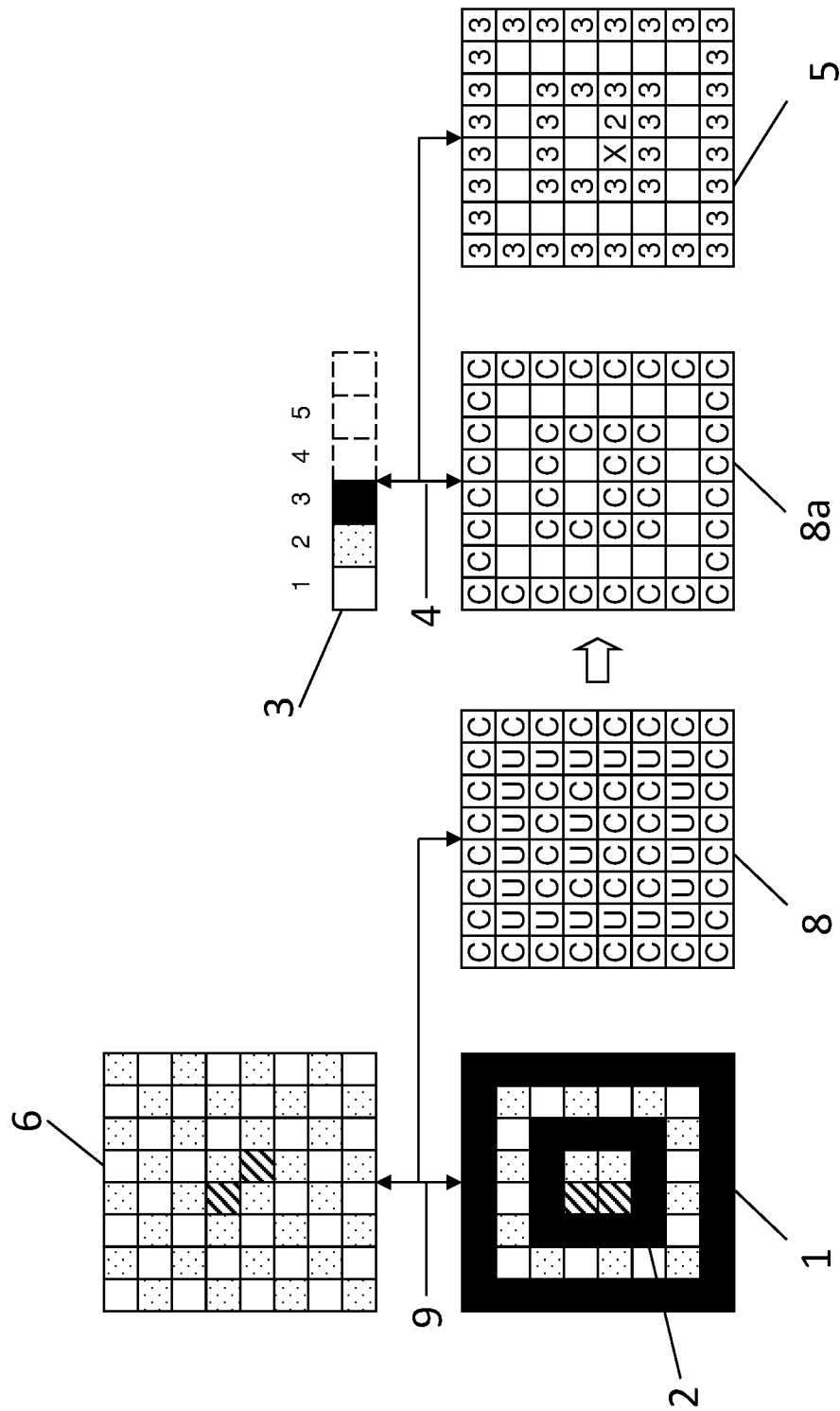
FIG. 4 shows, in schematic form, a different extension of the embodiment of FIG. 2.

FIG. 4 shows a similar extension to the method described above with reference to FIG. 2, as that of FIG. 3, but where the comparison 9 to a previous frame 6 is carried out before the comparison 4 with tiles in the cache memory 3. In this case, the tiles 2 in the received frame 1 are first compared (shown by arrow 9) to the corresponding tile, at the same location, in the previous frame 6, resulting in tiles that are unchanged or changed (marked "U" and "C", respectively, in frame 8). For the tiles that are unchanged, the instruction that the display data for that tile is unchanged is sent to the display control device, so that the display control device can re-use (or not update) the display data for that tile from the previous frame. For the tiles that are changed (shown in frame 8a), they are each compared (marked by arrow 4) to the tiles stored in the cache memory 3, as in the method described with reference to FIG. 2, and any matches are indicated in frame 5 with the matching cache ID and any tiles that do not match are shown marked with an "X". In this case, only one such tile results. The display data for that the tile(s) that do not match is then sent to the display control device.

It will be appreciated that a representation of the display data may be stored and/or transmitted, which may be the display data in uncompressed or in compressed form, or in the form of a hash of the display data resulting from performing a hash function on the display data, a cyclic redundancy check, CRC, value resulting from a CRC operation performed on the display data; or any other compressed form of the display data that can uniquely identify the display data, to enable the comparison operation to determine whether it "matches" or not, where such a match could be to a particular confidence threshold, rather than an "absolute" match.

Figure 5:
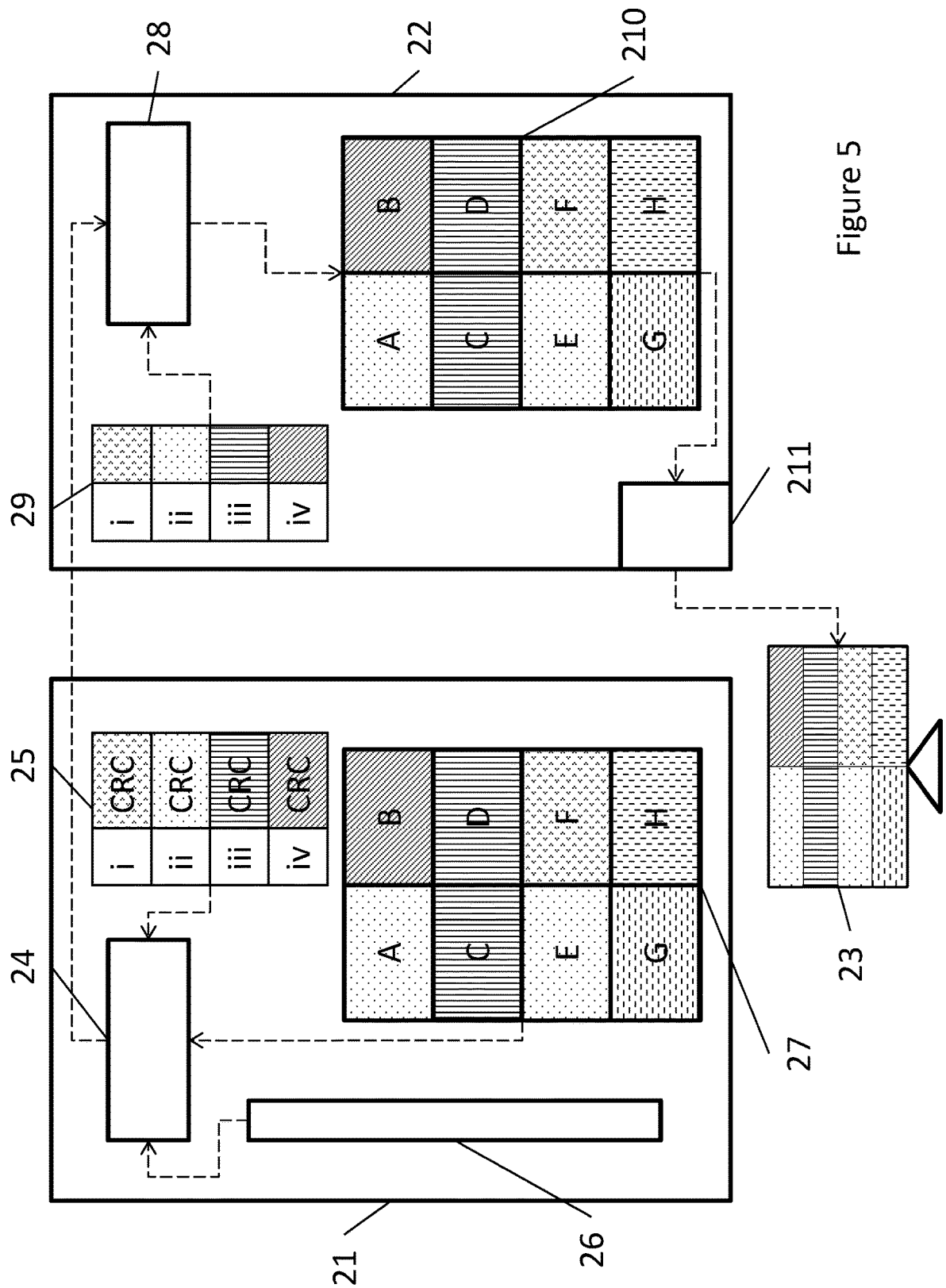
FIG. 5 is an example schematic of one embodiment of a system using caching.

FIG. 5 shows a host [21] which is connected to a display control device [22], which in turn is connected to a display device [23]. These connections may be wired or wireless, and may be across a network, including the internet. The host [21] contains a frame buffer [27], which contains eight Tiles that will have been produced by the host's GPU in the conventional way. This is connected to an encoder [24] which will perform required processing on the Tiles. The encoder [24] is also connected to a cache [25], which is an ordered list of recently-seen Tiles, ordered by how recently they have been seen with the least recent at the bottom. Each entry in the cache [25] also has an accompanying reference number: i, ii, iii, and iv where i refers to the most-recently-seen Tile and iv to the least-recently-seen Tile.

The cache [25] may store the full data comprising each Tile, or it may store a unique derivative of the data, such as the result of a hashing function. Because such a derivative would be unique to the Tile, it would still be useful for comparison but would require less space for storage than a whole Tile. This is indicated by the note 'CRC' in the diagram, referring to Cyclic Redundancy Check: another unique derivative of data that could be used. The Tile data referred to by each entry in the cache is indicated by the use of patterning, such that the pattern in the cache [25] matches the pattern of the Tile referred to: the data in position iv is indicated with dots, so it is the same as the data in Tile A of the frame buffer [27].

In this embodiment, the host [21] also contains a list [26] of the Tiles that made up the previous frame, ordered by Tile ID, known as the Previous Frame Store. As is the case for the cache [25], this buffer [26] may store the full data comprising each Tile, or it may store a unique derivative of each Tile. The Previous Frame Store [26] is also connected to the encoder [24] for use in checking to see if the Tile at a particular Tile ID has changed since the previous frame.

The encoder [24] is shown connected directly to a decoder [28] in the display control device [22], although in practice there may be output and input engines respectively. These would handle processing such as putting data into packets appropriate to the connection method between the host [21] and the display control device [22] and subsequently removing the packets and converting the data back into display data for use by the decoder [28].

The display control device [22] includes a decoder [28], as mentioned, which is connected to a cache [29] which is arranged to match the cache [25] in the host [21]. In the display control device [22], however, the cache [29] must hold complete Tile data, shown by the entries in the cache [29] patterned to match the Tiles shown in the frame buffers [27, 210] in the same way as on the host [21].

The decoder [28] is also connected to a frame buffer [210], which, when it is complete, will be identical to that [27] produced on the host [21]. In the diagram, it is shown as a complete frame. In turn, it is connected to an output engine [211], which reads the contents of the frame buffer [210] as appropriate for the display device [23] to which it is connected. For example, if the display device [23] expects to be sent a continuous stream of display data which it then rasters onto its display panel in lines, the output engine [211] reads across the entire frame buffer [210] in stripes and outputs data accordingly. Alternatively, if the display device [23] is updated in Tiles, the output engine may just read the data in Tiles from the frame buffer [210].

Finally, the display device [23] connected to the display control device [22] displays the Tiles as arranged in the frame buffer [210].

Figure 6:
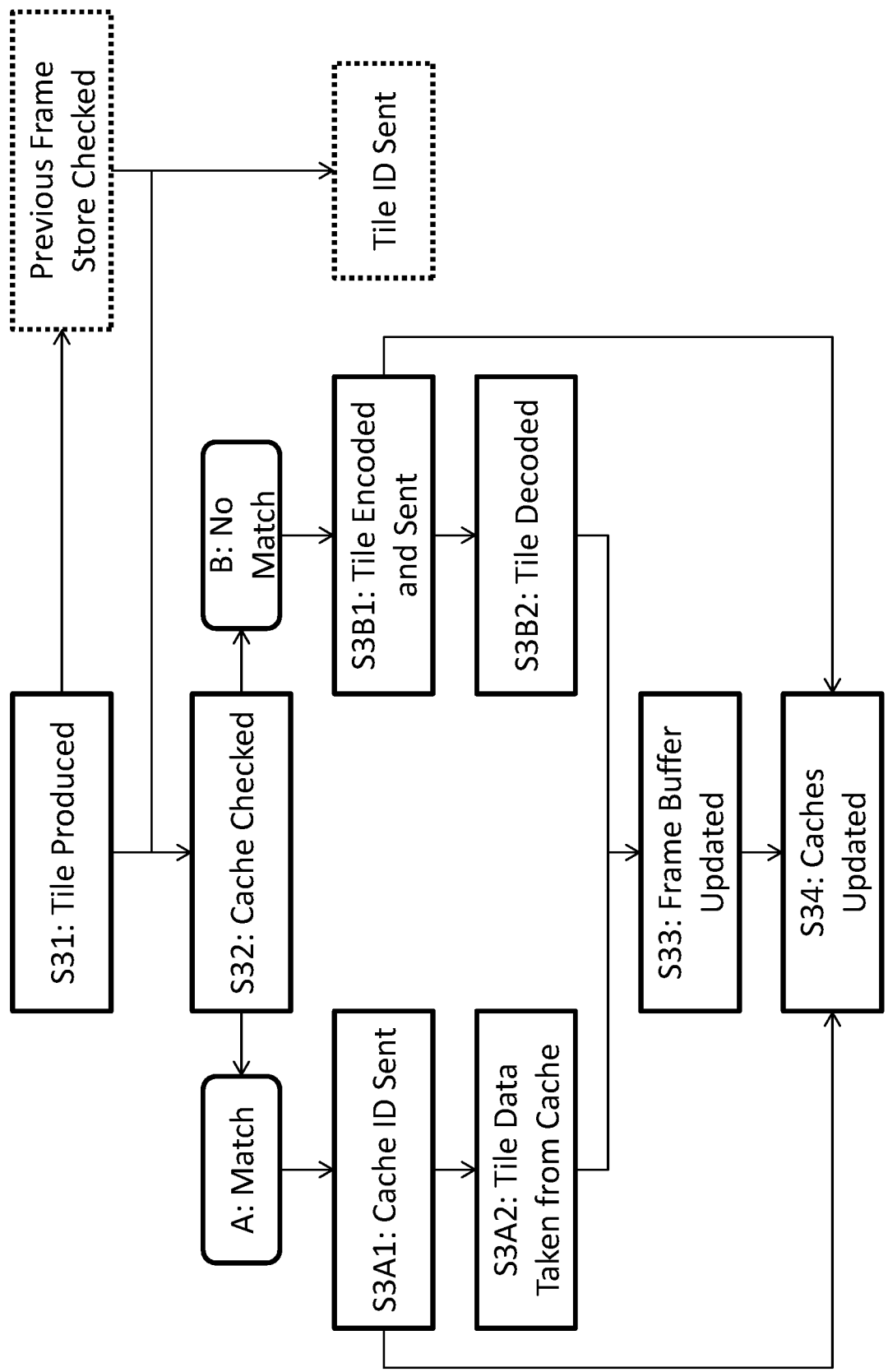
FIG. 6 is a flowchart showing the process of the system of FIG. 5.

FIG. 6 shows the progress of a Tile through the system shown in FIG. 5. In this first example, the Tile at Tile ID E, marked with dots, will be used.

At Step S31, the Tile is produced by the host's GPU and may be placed in the frame buffer [27] for storage or may be passed directly to the encoder [24] if it is able to process it immediately. In either case, the encoder [24] reads the Tile and begins processing it. If the cache [25] and any Previous Frame Store [26] hold derivatives of the Tile data for comparison purposes, the Tile will be processed to produce such a derivative at this time.

If the system uses entropy checking, the Tile will also be analysed for high entropy at this time and, if it is found to have high entropy, the cache [25] will not be used. It may be sent with a flag indicating that it has high entropy, so that the display control device [22] will also know that it should bypass use of the cache [29], or the display control device [22] may carry out a similar analysis.

If there is a Previous Frame Store [26] such as that shown in FIG. 2, the process will include the dotted boxes and the encoder [24] will at this point access the Previous Frame Store [26] at the Tile ID in order to see if that area of the frame has changed. If not—i.e., the Tile at that position in the previous frame was also marked with dots—the encoder [24] will not proceed further with the process and will simply transmit the Tile ID to the decoder [28] in order to notify it that the Tile has been processed but has not changed. The decoder [28] will therefore not change the contents of the frame buffer [210] from the previous frame. Alternatively, if there are multiple frame buffers and the display control device [22] rotates through them, it may copy the data at the appropriate position into the new frame buffer.

If the data in the new Tile does not match the data in the Previous Frame Store [26], or there is no Previous Frame Store [26], the process will continue through the boxes that do not have dotted outlines.

At Step S32, the encoder [24] compares the Tile data (or its derivative) with the contents of each cache [25] slot in turn, checking to see if the Tile data is already represented in the cache [25]. If so, the process follows the branch labelled A, otherwise it follows the branch labelled B.

At Step S3A2, the encoder [24] has found a cache entry that matches the Tile—in this example, entry ii. The two caches [25, 29] are co-ordinated so the Tile will also be stored at position ii in the cache [29] on the display control device [22], as can be seen from the fact that this entry is also marked with dots. As a result, the Tile data is not required and will be discarded. Instead, the encoder [24] sends the Cache ID ii.

At Step S3A2, the decoder [28] receives the Cache ID and takes the stored Tile data from the cache [29], which contains full Tile data. It is then able to use this data to update the frame buffer [210] held on the display control device [22] at Step S33.

At Step S34, the caches [25, 29] on both devices [21, 22] are updated such that the most recently accessed entry is at the top. In this example, this means that the positions in the cache of entries i and ii will be reversed such that the new entry i is marked with spots and the new entry ii is marked with chevrons. This may occur on the host [21] as soon as it has sent the Cache ID, which means that there is no need for any further synchronisation between the host [21] and the display control device [22] and the caches [25, 29] will always match.

In a second example, the Tile being transmitted is the Tile at Tile ID G, and as a result when the encoder [24] checks the cache [25] at Step S32 it does not find a matching entry. This means that the process will follow the branch labelled B.

At Step S3B1, the Tile is encoded and transmitted to the display control device [22], because since the Tile was not present in the cache [25] on the host [21] it will also not be present in the cache [29] on the display control device [22]. The process of encoding may also include compression and encryption of the data.

The display control device receives the encoded Tile at Step S3B2 and decodes it as appropriate. It then places it in the appropriate position in the frame buffer at Step S33.

At Step S34, the caches are updated. As is the case where the Tile was present in the cache, the host is likely to update its cache as soon as the encoded Tile has been transmitted, but the process is similar.

The encoder [24] at the host [21] will already have transformed the Tile data if necessary into the form required by the cache [25] in order to perform a comparison and see if the Tile is represented in the cache [25] at Step S32. Since this is the most recently-accessed data it needs to be put at the top of the cache [25]: in this case, in slot i. The encoder [24] therefore deletes the least-recently-accessed Tile (slot iv) and copies the contents of the higher slots into the lower slots such that they all move down a rank. It then places the transformed Tile data in slot i.

At the display control device [22], the same process is followed once the transmitted Tile data has been decoded by the decoder [28]. The cache [29] holds full Tile data, so when slot i has been freed as described above, the full Tile data is placed in the cache [29]. This means that the caches [25, 29] continue to match.

This embodiment and accompanying process are useful because they reduce the amount of redundant information being sent to the display control device [22]—if an identical Tile has recently been sent, even in a completely different location in the frame, it does not need to be sent again.

Figure 7:
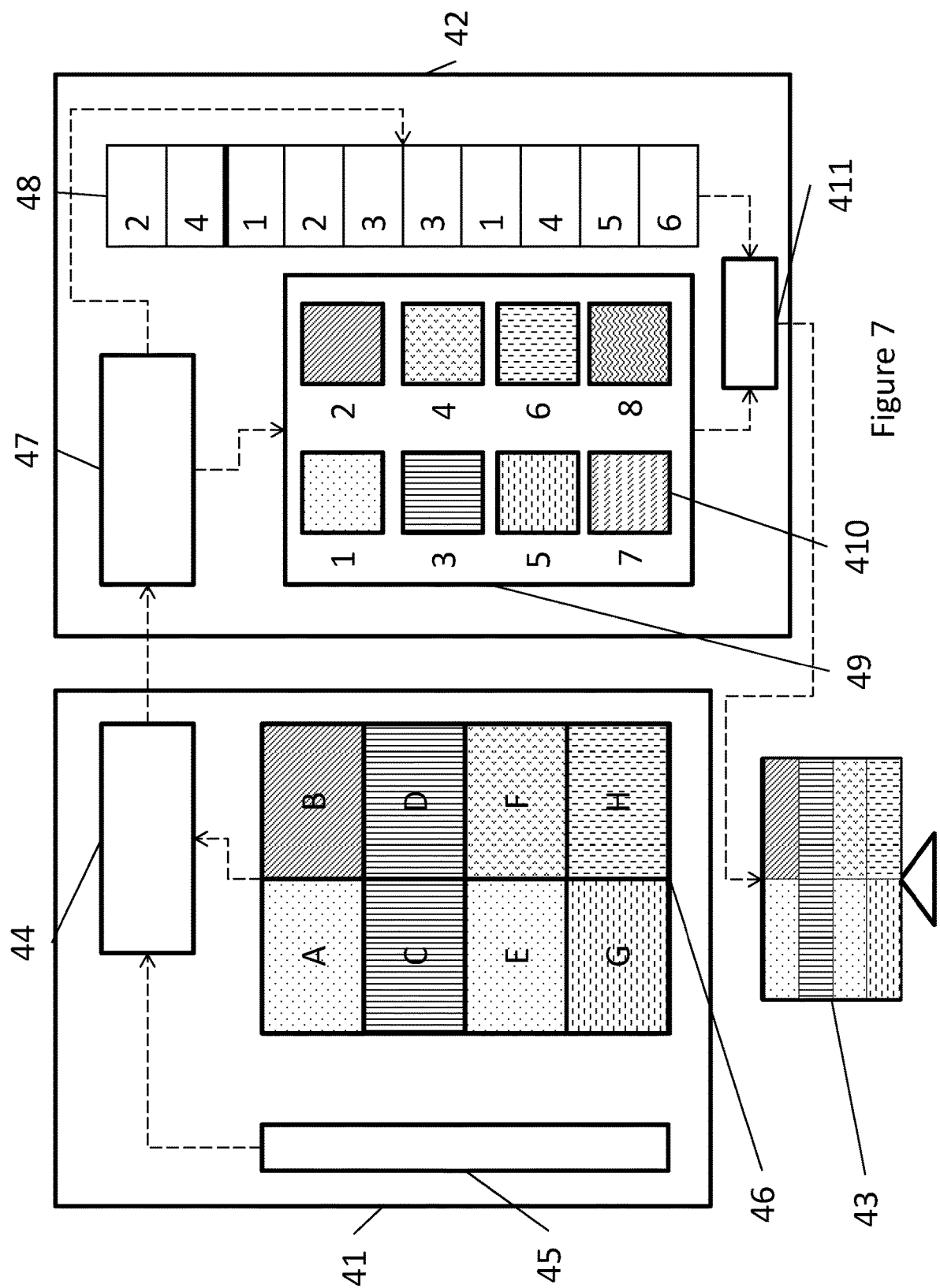
FIG. 7 is an example schematic of a second embodiment of a system using tile-based storage and a Frame List.

FIG. 7 shows another embodiment of the invention, which also comprises a host [41] connected to a display control device [42], which in turn is connected to a display device [43]. As in FIG. 5, the host [41] contains a frame buffer [46] and the optional Previous Frame Store [45], both of which are connected to an encoder [44]. Also, as in FIG. 5, the connection between any two of the three devices [41, 42, 43] may be wired or wireless, and may be across a network, including the internet.

The display control device [42] includes a decoder [47], which is connected to two memories [48, 49]. The first [49] is a main memory which has multiple slots [410], each holding a Tile. Each area [410] of the main memory [49] can be individually addressed, as shown by the labels 1-8. The memory [48] to which the decoder [47] is connected is a buffer, or a cache memory, containing, first, the dimensions of the frame, measured in Tiles. In this case, the frame is two Tiles wide and four deep, so those numbers occupy the first two slots in the buffer [48]. These could be populated upon the connection of a display device [43]. The remainder of the buffer [48] is known as the Frame List and contains pointers to the areas of memory [49] holding the Tiles to be used in the frame, in this case ordered from left to right and top to bottom. For example, the first slot in the Frame List [48] holds the pointer 1, which points to the first Tile in the main memory, which is marked with dots; this is the top left Tile in the frame. The fifth slot holds the same pointer because the Tile on the left in the third row of the frame is also marked with dots.

The memories [48, 49] are then connected to an output engine [411], which reads the pointers in the Frame List [48] and takes data from the appropriate areas of the main memory [49] according to the dimensions stored on the display control device [42] so that the frame is assembled on the fly. The output engine [411] then sends the display data to the display device [43], most conveniently as Tiles but possibly as stripes or lines as described above if the output engine [411] contains a small flow buffer for temporary storage.

Figure 8:
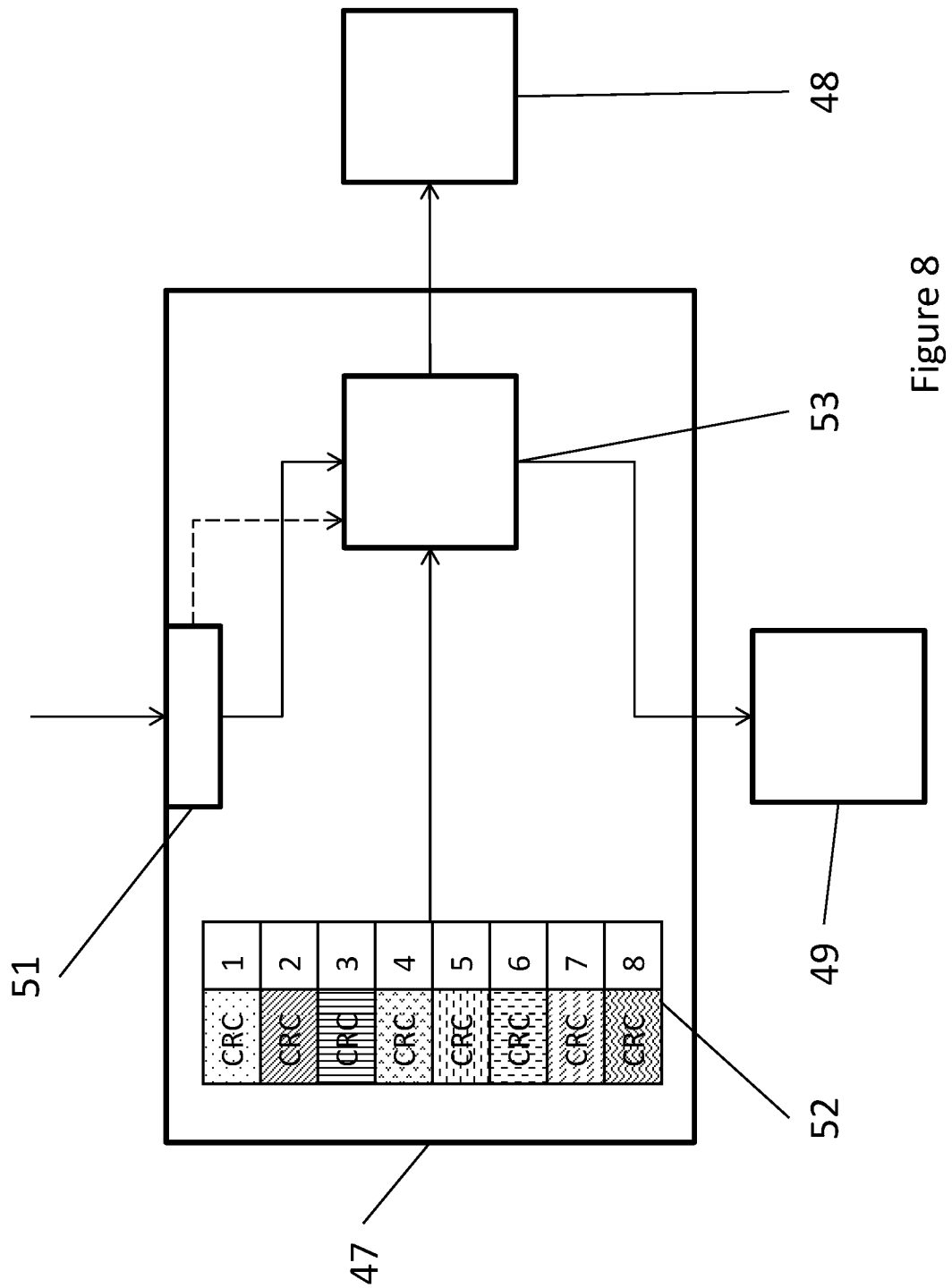
FIG. 8 is a detail of the decoder used in the system of FIG. 7.

FIG. 8 shows a detail of an example implementation of the decoder [47], which includes an identification engine [51] which receives incoming data, a lookup table [52] stored in a cache memory, and a decoding engine [53]. The decoding engine [53] is connected to the identification engine [51] through one connection to carry data (shown as a solid arrow) and a second connection (shown with a dotted arrow), to carry flags. The flag connection would be used to notify the decoding engine [53] of whether the data being sent to it is a Tile ID or the beginning of an encoded Tile. In an alternative example, this information may be contained in an internal packet header.

The lookup table [52] holds copies or unique derivatives of all Tiles stored in the main memory [49]. In this example, as in FIG. 5, the Tiles are stored as CRCs, which can be used for comparison while occupying less space than the full Tile data. Each Tile is associated with a pointer to the location [410] where that Tile is stored in the main memory [49], so when the decoding engine [53] checks the lookup table [52] it is able to find the correct pointer, if that Tile has been seen before, without any memory access.

The decoding engine [53] is further connected to the main memory [49] so that it can store Tiles in the main memory [49], and to the Frame List [48] so that it can update it with new Tiles.

Figure 9:
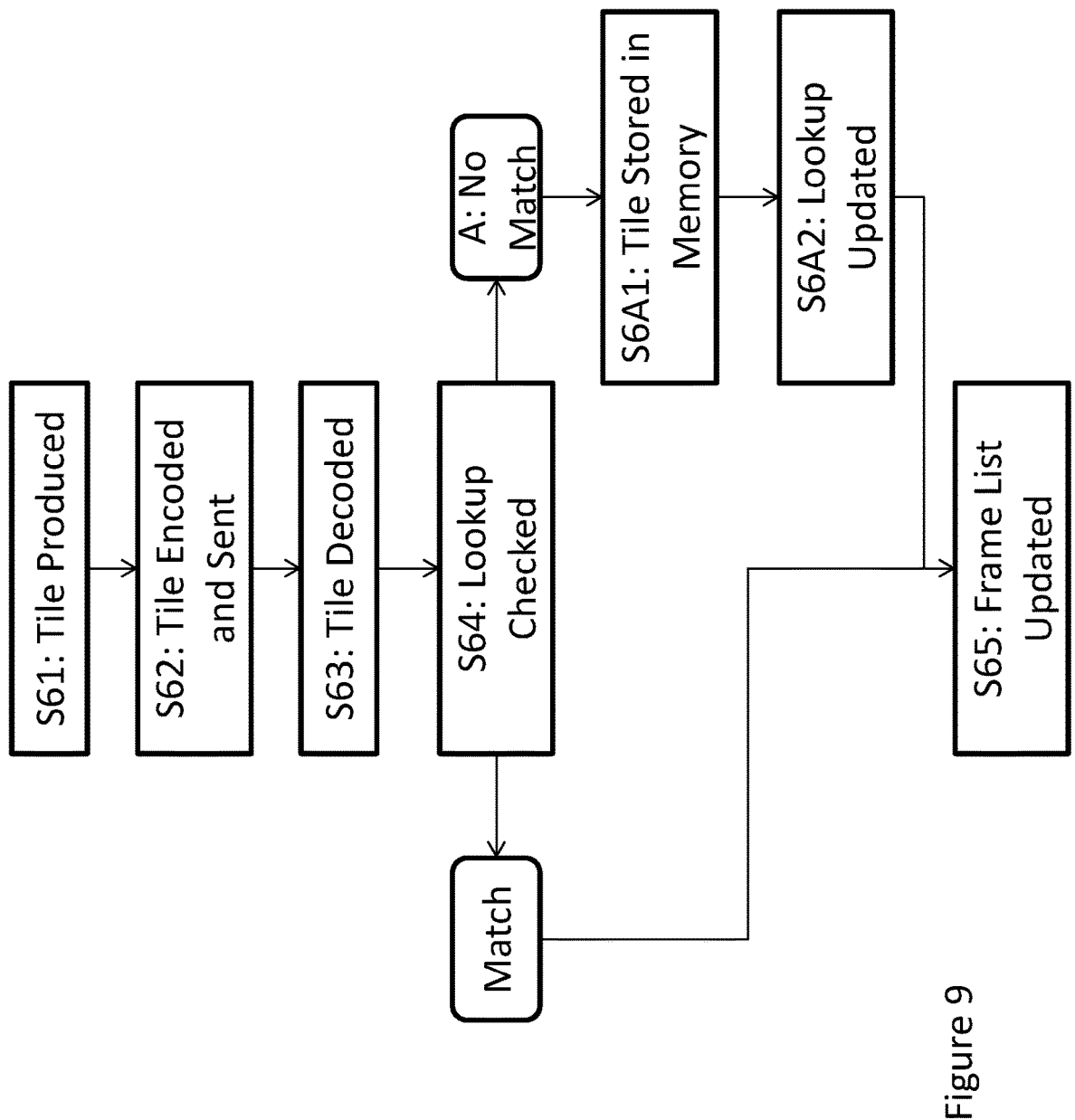
FIG. 9 shows a flowchart of the process of the system of FIGS. 7 and 8.

FIG. 9 shows the process followed by the devices shown in FIGS. 7 and 8.

At Step S61, a Tile is produced on the host [41] as previously described and placed in the frame buffer [46]. Each Tile is encoded and transmitted to the display control device [42] at Step S62, along with its Tile ID to enable the display control device [42] to place it correctly in the Frame List [48]. Optionally, in a host [41] such as that shown in FIG. 7 where there is a Previous Frame Store [45], before being encoded each Tile may be compared with the Tile at its Tile ID in the Previous Frame Store [45] and, if there is a match, the Tile ID transmitted alone, as previously described.

At Step S63, the transmitted data—either an encoded Tile or a Tile ID—is received by the display control device [42] and passed to the identification engine [51], which determines whether it is a Tile ID or an encoded Tile. It then passes the data to the decoding engine [53] along with a flag indicating its identification. If it is a Tile ID, the decoding engine [53] takes no further action as the data in the Frame List [48] from the previous frame is still correct. If it is an encoded Tile, the decoding engine [53] decodes it and, in this embodiment, generates a CRC for it. This is necessary because the Tile data in the lookup table [52] is referenced by the CRCs of the Tiles, not by the full Tile data. In another embodiment where the full Tile data is used, it will not be necessary to generate a CRC.

At Step S64 the decoding engine [53] checks the lookup table [52] to see if the Tile is already present in memory [49]. If there is a match in the lookup table [42], the process proceeds directly to Step S65 and updates the Frame List [48] with the pointer it finds in the lookup table [52]. For example, if the Tile being transmitted was Tile E, marked with dots, it is already present at position 1 in memory [49] and this location is stored in the first line of the lookup table [52]. The decoding engine [53] therefore places the pointer '1' at Tile ID E in the Frame List [48].

If, at Step S64, there is not a match with one of the entries in the lookup table [52], the process follows the branch labelled 'A'.

At Step S6A1, the decoding engine [53] stores the Tile in a free space in memory [49]. There could be a system provided for identifying the least-recently-used Tile which could be replaced in a case where the memory [49] is full, but otherwise the decoding engine [53] stores the full Tile data in the next free space and records the memory address of that space in the lookup table [52] at Step S6A2, along with the CRC generated at Step S63 or whatever other derivative of the Tile data is required for identification of the correct slot in the lookup table [52].

As an alternative method of identifying Tiles to be removed from memory [49] where there is no free space, the decoder [47] may also calculate the entropy level of each Tile and store this, for example as a third column in the lookup table [52]. Since a Tile with high entropy is less likely to be re-used (allowing for the fact that if a Previous Frame Store [45] is provided, if the same frame is repeated then the Tiles will all be left in place and no further data sent), a new Tile could replace the Tile stored in memory [49] that has the highest entropy.

Finally, at Step S65, the decoding engine [53] stores the pointer to the correct area of memory [410] in the Frame List [48].

Figure 10:
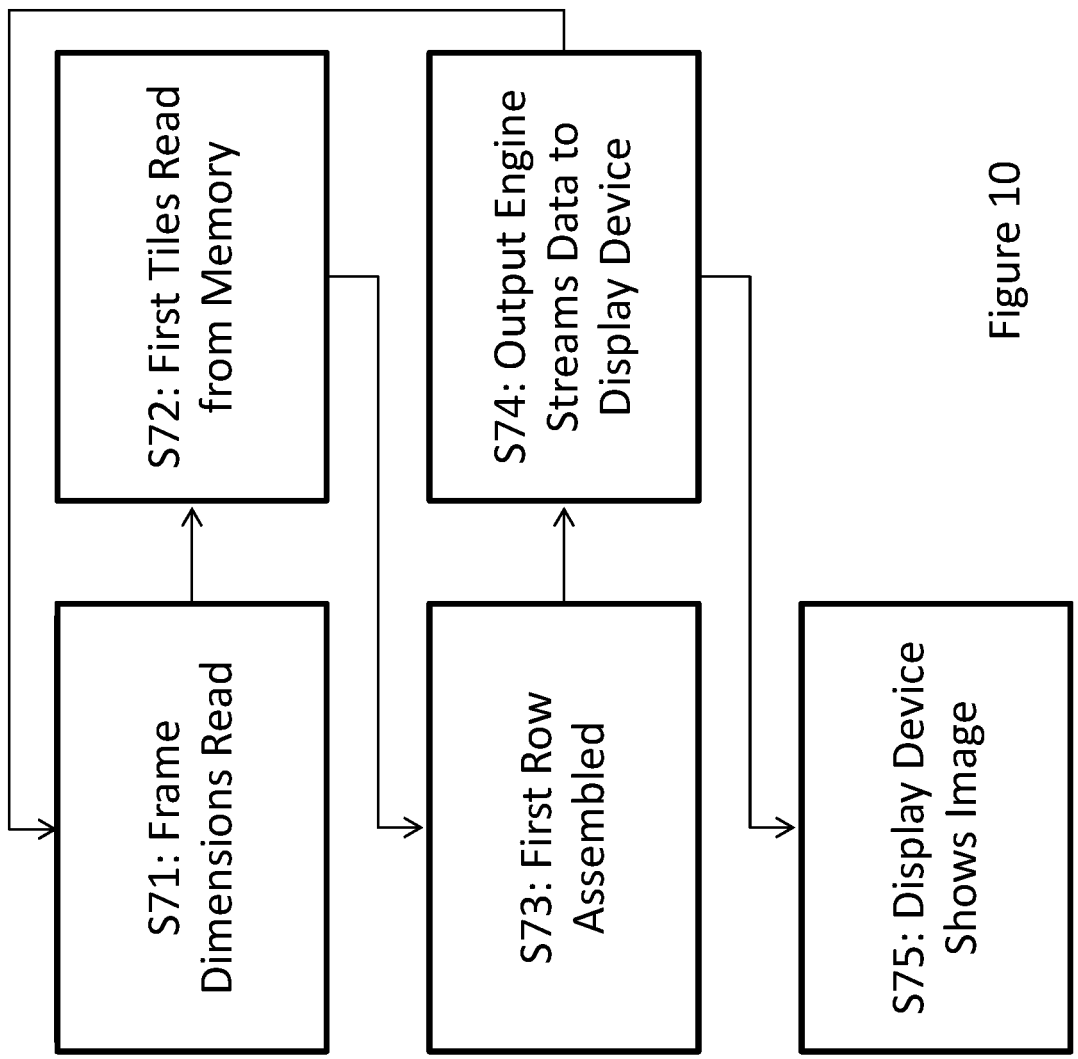
FIG. 10 shows a flowchart of the process followed by the output engine in the system of FIG. 7.

FIG. 10 shows the process of preparing a frame for display in the embodiment shown in FIG. 7, where the display device [43] is a conventional display device which rasters image data in lines.

As previously mentioned, the dimensions of the frame, measured in Tiles, are stored in the Frame List [48]—in this case the frame is two Tiles wide by four deep—and this data is read by the output engine [411] at Step S71. It is therefore aware of the number of Tiles in each row of Tiles and will be able to read that many Tiles from memory [49] at a time.

At Step S72, the output engine [411] reads the appropriate number of Tiles—in this case two—from the memory addresses stored in the Frame List [48] and, at Step S73, stores them in its own smaller internal memory such that it is able to read the image data contained in them in lines as required by the display device [43].

At Step S74, it then reads across both Tiles to form a stream of pixel data, which it transmits to the display device [43] as required. The display device [43] then rasters the data onto its display panel to show the required image at Step S75.

Figure 11:
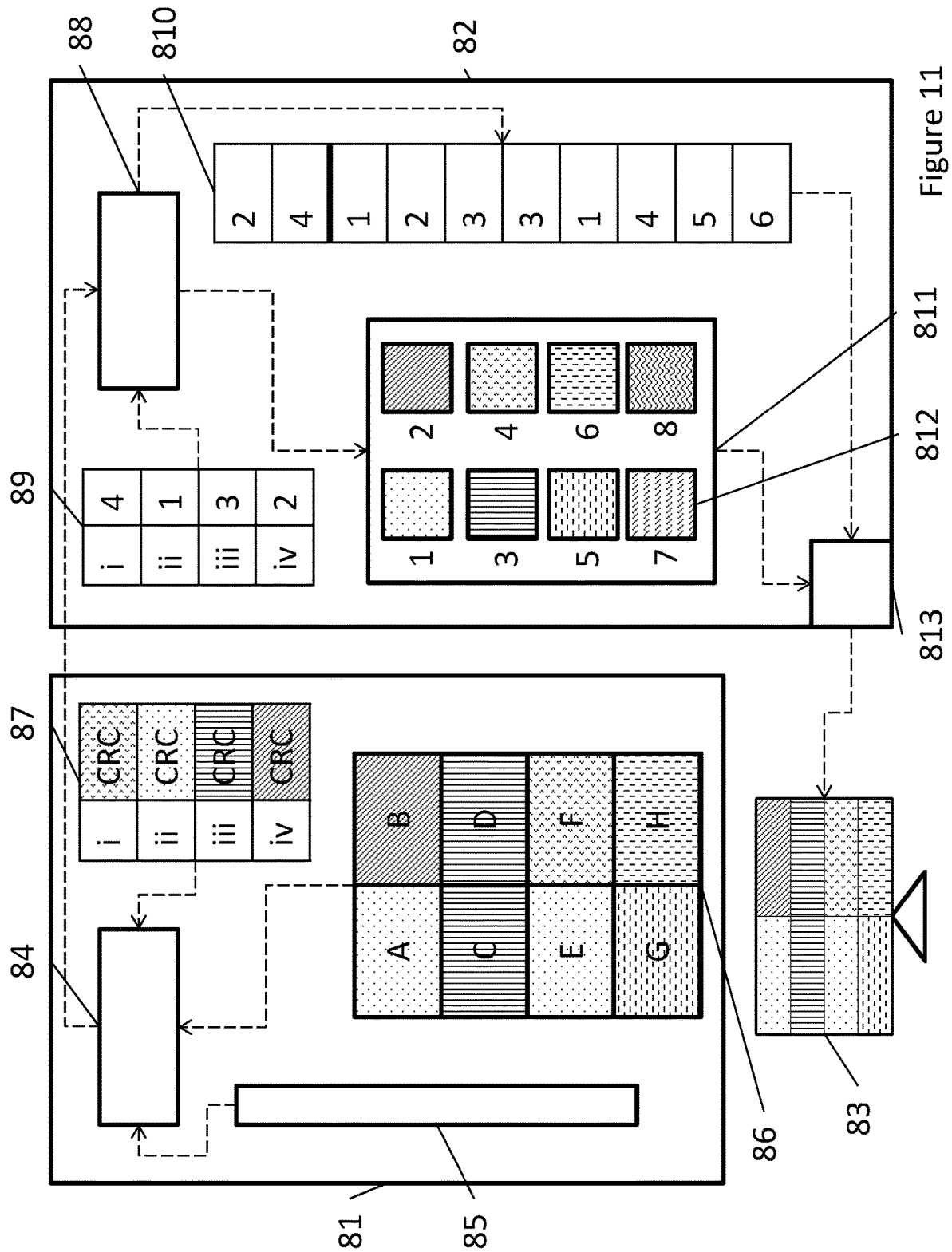
FIG. 11 is an example schematic of a further embodiment of a system using both caching and tile-based storage with a Frame List.

FIG. 11 shows a schematic of a system according to a combination of the above systems, comprising a host [81], a display control device [82], and a display device [83] connected to one another as previously described. The host [81] contains a frame buffer [86], a cache [87] as described in FIG. 5, and, in this case, a Previous Frame Store [85], as well as an encoder [84]. The encoder [84] is shown connected to a decoder [88] on the display control device [82] and, within the host [81], is also connected to the Previous Frame Store [85], frame buffer [86], and cache [87].

The display control device [82] contains a cache [89] similar to that shown in FIG. 5, but instead of containing Tile data it contains pointers to the locations in memory [812] where the Tiles are stored. It is connected to the decoder [88]. The display control device [82] also contains a memory [811], a Frame List [810], and an output engine [813] such as those shown in FIG. 7. The memory [811] and the Frame List [810] are connected to the output engine [813].

Figure 12:
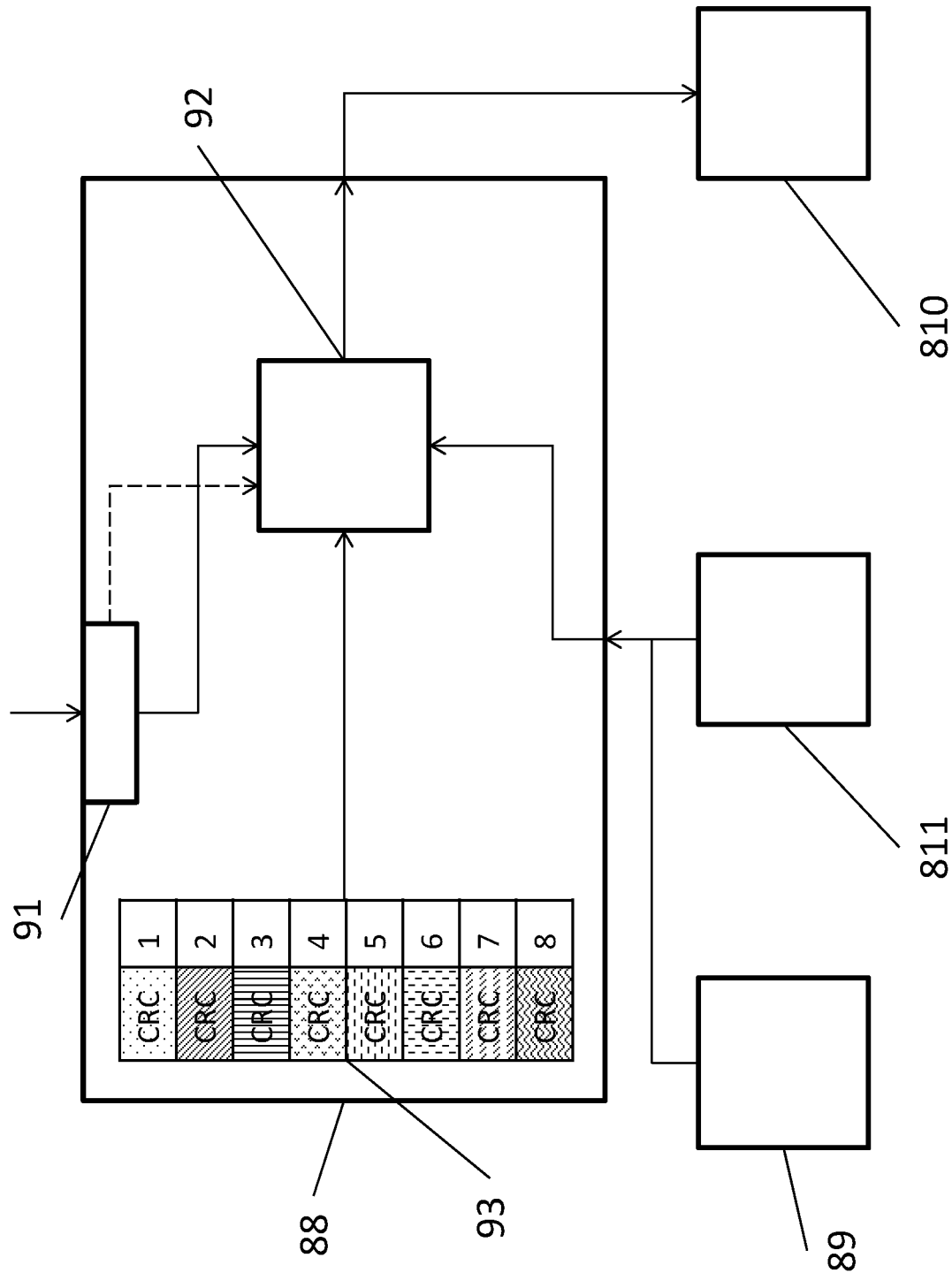
FIG. 12 is a detail of the decoder used in the system of FIG. 11.

FIG. 12 shows a detail of the decoder [88] in the display control device [82]. Like the decoder [47] shown in FIG. 8, it contains an identification engine [91] which may, for example, check packet headers to identify the type of data it is receiving: whether it is an encoded Tile, a Cache ID, or, in this embodiment, a Tile ID. As in FIG. 8, it is connected to the decoding engine [92] by two lines, one (shown by a dotted arrow) carrying identification flags for the data which passes down the second connection (shown by a solid arrow). The decoding engine [92] is, in turn, connected to the cache [89], a lookup table [93] in a cache memory, such as that shown in FIG. 8, and the main memory [811].

Thus, it will be clear that are in effect two cache memories (where a cache memory is a small piece of memory close to the processor where data can be placed for quick access). One [89] stores pointers to a limited number of the memory locations in the local memory [811] where the actual display data [812] is stored. This cache memory [89] is analogous to the cache memory in a previous embodiment that (on the display control device [82]) stores full data of the Tiles. The other [93] stores unique values for the display data of each tile along with the pointers to the location of the actual data [812] for that tile. This lookup table is used for looking up the memory locations of the full data [812] according to the unique code. In FIGS. 11 and 12, therefore, the Roman numerals are the CacheIDs, (match identification), which provides the position in the cache [87, 89], or some other means of identifying the particular tile information in the cache memory [87, 89]. The Arabic numerals are the pointers and refer to memory locations in the local memory [811]. The same numbers are used in both cache memories.

Thus, when a Cache ID comes in, only the main cache [89] is used and the decoder [88] retrieves the appropriate pointer from the cache [89] and puts it in the appropriate location in the frame list [810], according to the Tile ID. When a Tile comes in, it is not available in the cache [89] (or a Cache ID would have been sent) so the decoder [88] uses the lookup table [93] to check if the incoming Tile is a duplicate of one already stored—it generates the unique value representation and searches for it in the lookup table [93]. If it is present, it takes the appropriate pointer from the lookup table [93] and puts it in the frame list [810], then updates the cache [89] as appropriate. If the Tile isn't in the lookup table [93] either, it is completely new and is stored in memory [811]. The decoder [88] then updates the lookup table [93] by inserting the value representation and the pointer and also updates the frame list [810] and the cache [89] as if it had been in there to start with.

Accordingly, in this embodiment, the method includes:
1. Receive data;
2. If data is a Cache ID:
   a. Fetch pointer from appropriate position in cache [89];
   b. Place pointer in frame list [810];
   c. Update cache [89] as appropriate (move most recent value to the top etc.);
3. If data is a Tile:
   a. Generate unique reference;
   b. Check if unique reference is present in lookup table [93];
   c. If so:
      i. Fetch pointer from lookup table [93];
   d. If not:
      i. Place full tile data in local memory [811];
      ii. Place pointer to tile's location in local memory with unique reference in lookup table [93];
   e. Place pointer in frame list [810];
   f. Place pointer in cache [89].

Figure 13:
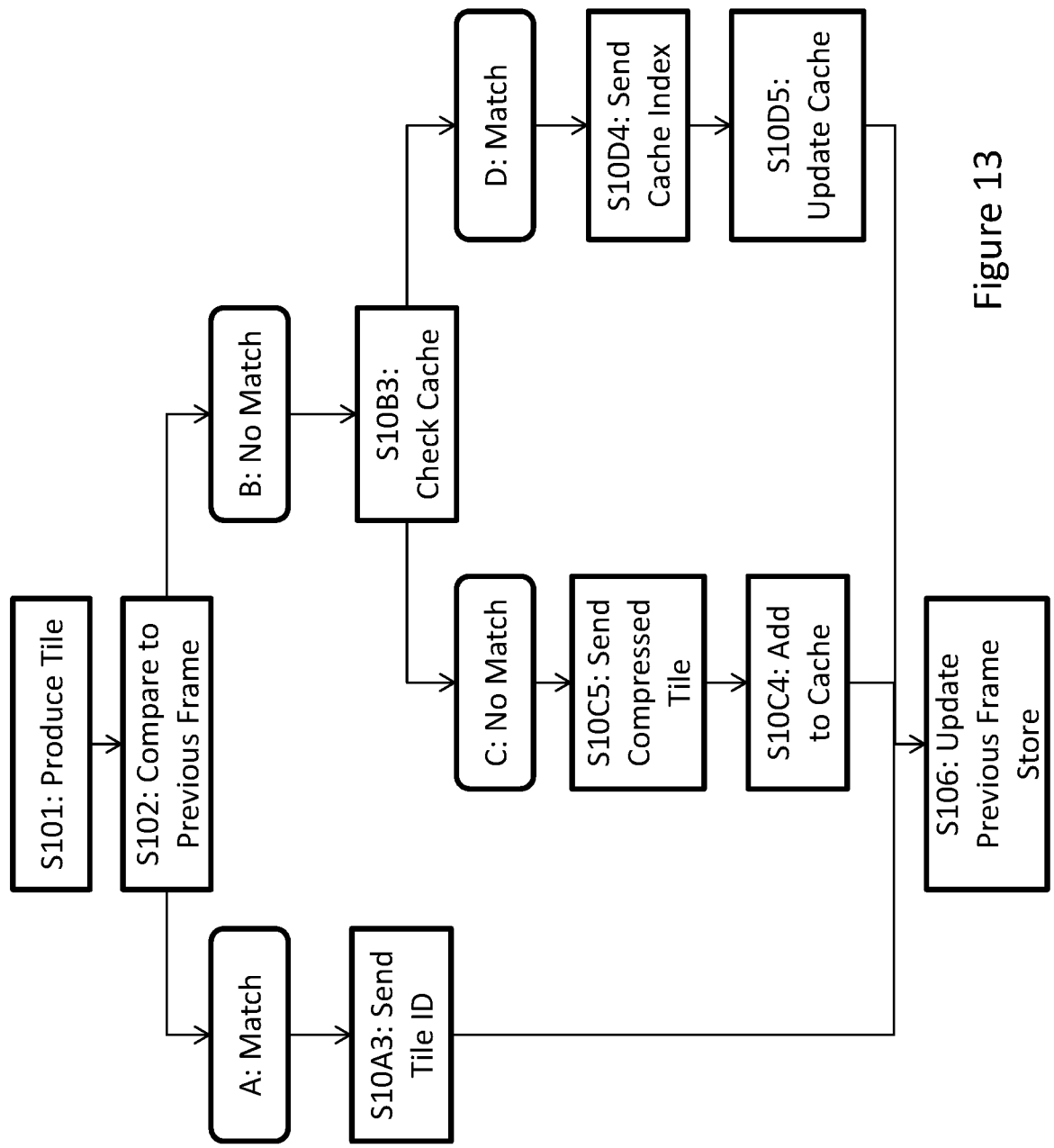
FIG. 13 shows the process followed by the host in the system shown in FIG. 11.

FIG. 13 shows, in more detail, the process followed by the host [81] when it 'sends' a Tile to the display control device [82]. At Step S101, the host [81] produces a Tile as previously described and it is placed in the frame buffer [86], then passed to the encoder [84]. The host [81] has a Previous Frame Store [85], so at Step S102, the Tile is compared to the Tile at its equivalent position in the Previous Frame Store [85]. Preferably, it is first converted to a CRC or similar unique derivative, and such a derivative is also stored in the Previous Frame Store [85] and cache [87], as shown in FIG. 11.

If the Tile matches the Tile data at the corresponding Tile ID in the Previous Frame Store [85], the process follows the branch labelled A and, at Step S10A3, the encoder [84] sends the Tile ID to the display control device [81] and discards the Tile. Because the Previous Frame Store [85] already contains the Tile at that Tile ID, it does not in fact have to be updated at Step S106.

If the Tile does not match the data stored in the Previous Frame Store [85], the encoder [84] follows the branch labelled B and compares it to the contents of the cache [87] as described in FIG. 6 at Step S10B3.

If the Tile matches a Tile already referenced in the cache [87], the process follows the branch labelled D, which from the host side is identical to the process shown in FIG. 6: at Step S10D4, the host [81] transmits the Cache ID, and at Step S10D5 it updates the cache [87] such that the most recent Tile is at the top of the cache [87]—in this case, at Cache ID i.

If the Tile does not match a Tile referenced in the cache [87], the process follows the branch labelled C. At Step S10C5, the encoder [84] encodes and transmits the Tile in the conventional way, and then at Step S10C4 it updates the cache [87] as previously described such that the new Tile is at the top of the cache [87], at Cache ID i.

In both cases, the host [81] then updates the Previous Frame Store [85] at Step S106 in order to place the new Tile in the appropriate location for subsequent comparison.

Figure 14A:
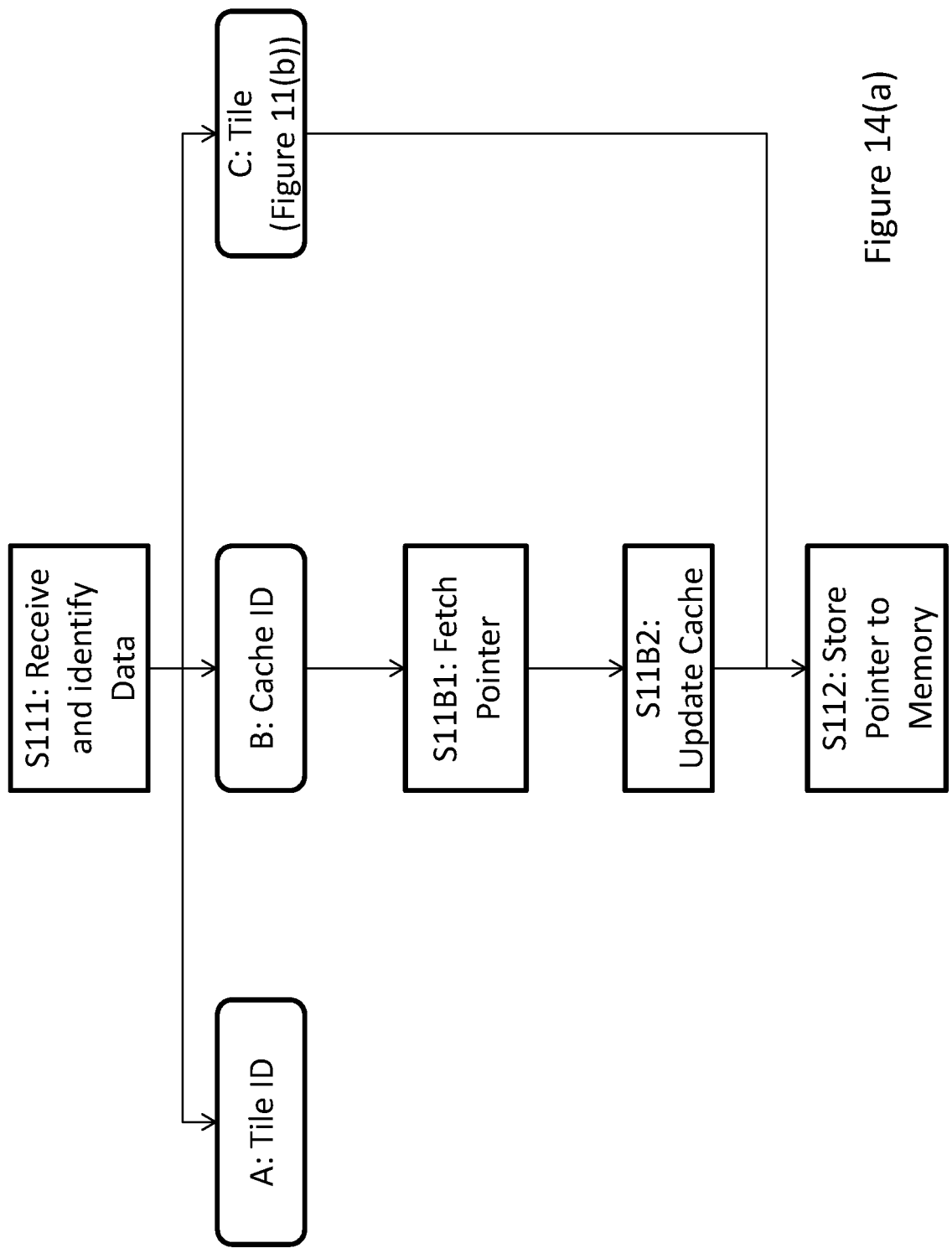
FIGS. 14(a) and 14(b) show the process followed by the display control device in the system shown in FIGS. 11 and 12.
Figure 14B:
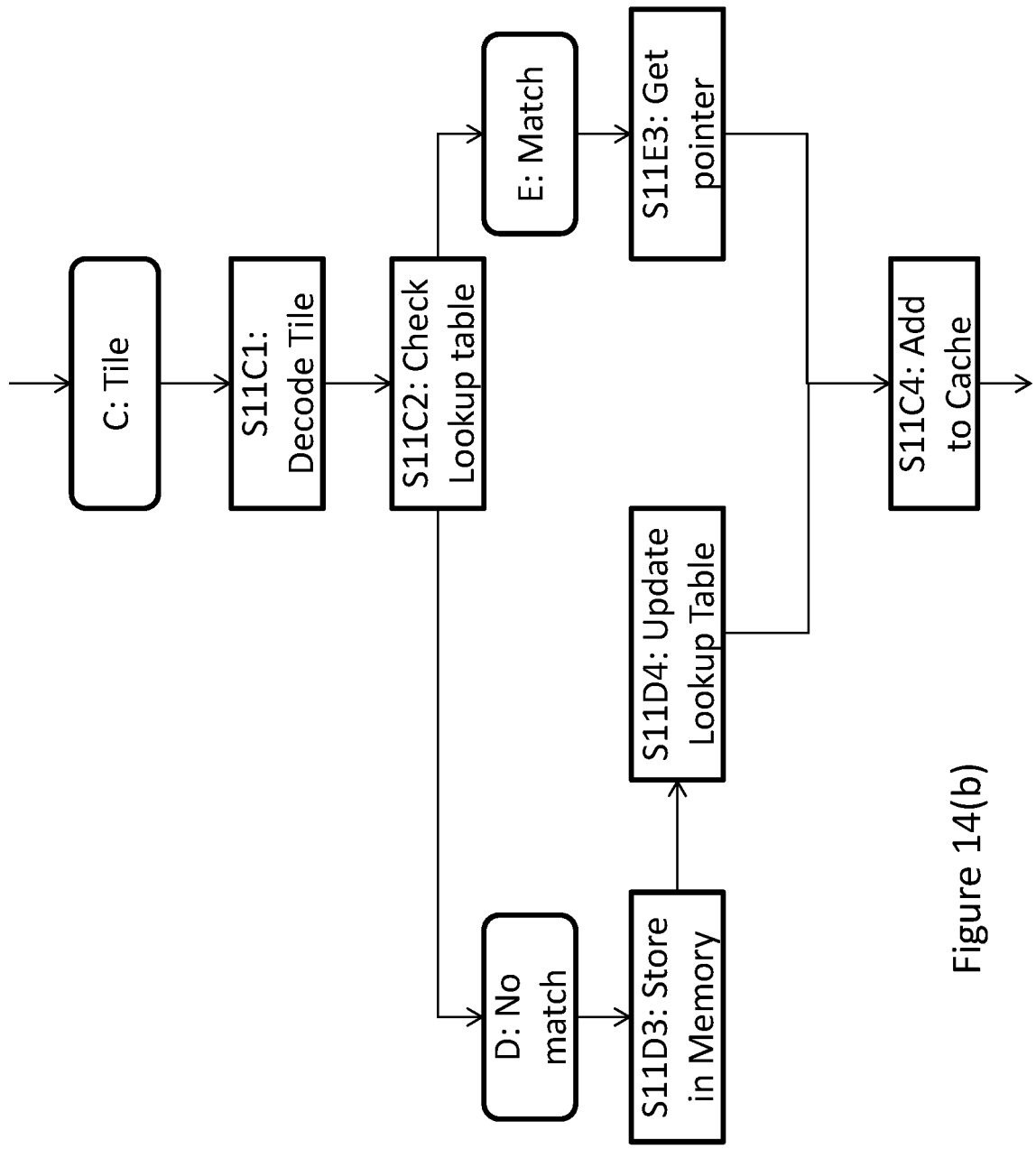

FIG. 14 shows the corresponding process followed by the display control device [82] when it receives a piece of data transmitted by the host [81] which may be either a Tile ID, a Cache ID, or an encoded Tile.

At Step S111, the display control device [82] receives the data and it is passed to the identification engine [91] in the decoder [88]. As aforementioned, this then identifies the incoming data as either a Tile ID, a Cache ID, or an encoded Tile.

If the data is a Tile ID, the process follows the branch labelled A and the identification engine [91] sends the Tile ID with a flag indicating that it is a Tile ID to the decoding engine [92]. Since this indicates that the data in the Frame List [810] at that location is already correct, the decoding engine [92] discards the Tile ID, though its presence may be used as part of error checking to ensure that all the Tiles in the frame buffer [86] were at least checked.

If the data is a Cache ID, the process follows the branch labelled B and the identification engine [91] sends the Cache ID with a flag indicating that it is a Cache ID to the decoding engine [92].

At Step S11B1, the decoding engine [92] fetches the pointer to the appropriate data from the cache [89], using the Cache ID as an indication of which slot holds the required data. It then updates the cache [89] as previously described at Step S11B2 and sends the pointer retrieved from the cache [89] to the appropriate position in the Frame List [810] at Step S112.

If the data is an encoded Tile, the process follows the branch labelled C, the details of which are shown in FIG. 11(b). The identification engine [91] sends the full encoded Tile data to the decoding engine [92] together with a flag to indicate that it is sending a Tile. The decoding engine [92] then decodes the Tile and, in this case, generates a CRC for use in comparisons.

At Step S11C2, the decoding engine [92] checks the lookup table [93] to see if the Tile is already stored in memory [811] and has simply dropped out of the cache due to infrequent use. If so, the process follows the branch labelled E, if not it follows the branch labelled D.

At Step S11E3, the Tile is represented in the lookup table [93], which means that it is stored in memory [811] and the decoding engine [92] is able to take the pointer from the lookup table [93] in the same way as from the cache [89]. No memory interaction is needed. The decoder [88] then adds the new Tile to the cache [89] such that it displaces the least-recently-used item in the cache [89], as previously described. This will mean that the cache [89] on the display control device [82] will match the cache [87] on the host [81] and Cache IDs can be used. Finally, at Step S112 of FIG. 11(a), the decoding engine [92] stores the pointer retrieved from the lookup table [93] in the Frame List [810] as previously described.

If the Tile was not represented in the lookup table [93], the Tile is not stored in memory [811] and, at Step S11D3, the decoder [88] stores it in memory [811] as previously described. It then updates the lookup table [93] at Step S11D4 by inserting the CRC of the Tile and the memory location [812] where it is now stored.

At Step S11C4, the decoding engine [92] then updates the cache [89] by adding the new Tile, as previously described. Finally, at Step S112 of FIG. 11(a), it stores the new pointer in the appropriate place in the Frame List [810].

It will be appreciated that although only a few particular embodiments of the invention have been described in detail, various modifications and improvements can be made by a person skilled in the art without departing from the scope of the present invention, as defined by the attached claims.

The invention claimed is:

1. A method of managing display data at a host device, the host device being separate from a remote display control device and a remote display device, the remote display control device controlling the remote display device to display the display data, the method comprising, at the host device:

receiving display data, generated at the host device, for a frame to be displayed on the remote display device controlled by the remote display control device, the frame of display data being divided into a plurality of tiles, where each tile is formed of display data for a plurality of pixels to be combined into the frame at the remote display control device for display on the remote display device;

determining a tile identification of a tile, the tile identification including a location of the tile within the frame to be displayed;

determining whether a representation of the display data of the tile matches, within a predetermined threshold, a representation of display data of one or more tiles stored in a host cache memory at the host device and replicated in a display control cache memory at the remote display control device;

if the representation of the display data of the tile matches the representation of display data of a stored tile:

determining a match identification of the matching stored tile in the host cache memory;

associating the tile identification with the match identification; and transmitting the tile identification and the associated match identification for the tile to the remote display control device; or if the representation of the display data of the tile does not match the representation of display data of any of the stored tiles:
  transmitting the tile identification and the display data for the tile to the remote display control device; and
  determining whether to store the representation of the display data of the tile in the host cache memory based on a likelihood that the display data of the tile will be repeated in a subsequent frame of display data.

2. A method according to claim 1, further comprising, prior to transmitting the tile identification and the display data for the tile to the remote display control device:
  comparing the tile with a corresponding tile at a corresponding location in a previous frame to determine whether the tile is changed or unchanged compared to the corresponding tile;
  if the tile is unchanged, sending to the remote display control device the tile identification and instructions to use the display data of the corresponding tile; and
  if the tile is changed, transmitting the tile identification and the display data for the tile to the remote display control device.

3. The method according to claim 2, wherein the match identification includes a location of the stored tile within the host cache memory.

4. The method according to claim 2, further comprising synchronizing the host cache memory with the display control cache memory at the display control device.

5. The method according to claim 2, further comprising:
  if a determination is made to store the representation of the display data of the tile in the host cache memory based on a likelihood that the display data of the tile will be repeated in a subsequent frame of display data, storing the representation of the display data of the tile in the host cache memory.

6. The method according to claim 5, further comprising determining whether the representation of the display data is to be locally stored, and, if it is determined that the representation of the display data is to be locally stored, then storing the representation of the display data of the tile in the host cache memory.

7. The method according to claim 5, wherein storing the representation of the display data comprises determining a location for the storage of the representation of the display data of the tile within the host cache memory.

8. The method according to claim 7, further comprising transmitting the location for the storage of the representation of the display data of the tile to the remote display control device.

9. The method according to claim 2, wherein the representation of the display data comprises one or more of:
  the display data;
  a hash of the display data resulting from performing a hash function on the display data;
  a cyclic redundancy check (CRC) value resulting from a CRC operation performed on the display data; or
  any other compressed form of the display data that can uniquely identify the display data.

10. The method according to claim 2, wherein transmitting the display data to the remote display control device comprises encoding the display data and transmitting the encoded display data to the remote display control device.

11. A method according to claim 1, further comprising, prior to determining whether a representation of the display data of the tile matches, within a predetermined threshold, a representation of display data of one or more tiles stored in the host cache memory:
  comparing the tile with a corresponding tile at a corresponding location in a previous frame to determine whether the tile is changed or unchanged compared to the corresponding tile;
  if the tile is unchanged, sending to the remote display control device the tile identification and instructions to use the display data of the corresponding tile;
  wherein if at least one tile is changed, for each changed tile, proceeding with the step of:
    determining whether a representation of the display data of the tile matches, within a predetermined threshold, a representation of display data of one or more tiles stored in the host cache memory; and the subsequent steps.

12. The method according to claim 3, wherein the match identification includes a location of the stored tile within the host cache memory.

13. The method according to claim 11, further comprising synchronizing the host cache memory with the display control cache memory at the remote display control device.

14. The method according to claim 11, further comprising:
  if a determination is made to store the representation of the display data of the tile in the host cache memory based on a likelihood that the display data of the tile will be repeated in a subsequent frame of display data, storing the representation of the display data of the tile in the host cache memory.

15. The method according to claim 14, further comprising determining whether the representation of the display data is to be locally stored, and, if it is determined that the representation of the display data is to be locally stored, then storing the representation of the display data of the tile in the host cache memory.

16. The method according to claim 14, wherein storing the representation of the display data comprises determining a location for the storage of the representation of the display data of the tile within the host cache memory.

17. The method according to claim 16, further comprising transmitting the location for the storage of the representation of the display data of the tile to the remote display control device.

18. The method according to claim 11, wherein the representation of the display data comprises one or more of:
  the display data;
  a hash of the display data resulting from performing a hash function on the display data;
  a cyclic redundancy check (CRC) value resulting from a CRC operation performed on the display data; or
  any other compressed form of the display data that can uniquely identify the display data.

19. A method according to claim 11, wherein transmitting the display data to the remote display control device comprises encoding the display data and transmitting the encoded display data to the remote display control device.

20. The method according to claim 1, wherein the match identification includes a location of the stored tile within the host cache memory.

21. The method according to claim 1, further comprising synchronizing the host cache memory with the display control cache memory at the remote display control device.

22. The method according to claim 1, further comprising:
  if a determination is made to store the representation of the display data of the tile in the host cache memory based on a likelihood that the display data of the tile will be repeated in a subsequent frame of display data, storing the representation of the display data of the tile in the host cache memory.

23. The method according to claim 22, further comprising determining whether the representation of the display data is to be locally stored, and, if it is determined that the representation of the display data is to be locally stored, then storing the representation of the display data of the tile in the host cache memory.

24. The method according to claim 22, wherein storing the representation of the display data comprises determining a location for the storage of the representation of the display data of the tile within the host cache memory.

25. The method according to claim 24, further comprising transmitting the location for the storage of the representation of the display data of the tile to the remote display control device.

26. The method according to claim 1, wherein the representation of the display data comprises one or more of:
   the display data;
   a hash of the display data resulting from performing a hash function on the display data;
   a cyclic redundancy check (CRC) value resulting from a CRC operation performed on the display data; or
   any other compressed form of the display data that can uniquely identify the display data.

27. The method according to claim 1, wherein transmitting the display data to the remote display control device comprises encoding the display data and transmitting the encoded display data to the remote display control device.

28. A method of managing display data at a display control device, the display control device being separate from a remote host device, the display control device being connected to a display device for controlling the display device to display the display data, the method comprising, at the display control device:
   receiving from the remote host device, information regarding display data for a frame to be displayed on the display device controlled by the display control device, the frame of display data being divided into a plurality of tiles, where each tile is formed of display data for a plurality of pixels to be combined into the frame at the remote display control device for display on the display device, wherein the information comprises, for each tile, either:
      a tile identification and an associated match identification for the tile, the tile identification including a location of the tile within the frame to be displayed and the match identification identifying a stored tile in a display control cache memory at the display control device and replicated in a host cache memory at the remote host device; or
      the tile identification and the display data for the tile;
   wherein, if the information comprises the tile identification and an associated match identification for the tile, the method further comprising:
      identifying a stored tile in the display control cache memory from the associated match identification;
      retrieving display data of the stored tile from the display control cache memory or from a local memory based on a pointer retrieved from the display control cache memory; and
      controlling the display device to display the display data of the stored tile at the location in the tile identification; or
   if the information comprises the tile identification and the display data for the tile, the method further comprising:
      determining whether to store the display data of the tile in the display control cache memory as a stored tile or at a location in a local memory with a pointer to the location in the local memory being stored in the display control cache memory, based on a likelihood that the display data of the tile will be repeated in a subsequent frame of display data; and
      controlling the display device to display the display data from the location in the tile identification.

29. The method according to claim 28, wherein the information alternatively comprises, for each tile:
   the tile identification and instructions to re-use display data of a corresponding tile at a corresponding location in a previous frame;
   wherein, if the information comprises the tile identification and the instructions to re-use display data of a corresponding tile at a corresponding location in a previous frame, the method further comprises:
      identifying the corresponding tile at the corresponding location in the previous frame; and
      controlling the display device to display the display data of the corresponding tile at the location in the tile identification.

30. The method according to claim 29, wherein the match identification includes a location of the stored tile within the display control cache memory.

31. The method according to claim 29, further comprising synchronizing the display control cache memory with the host cache memory at the remote host device.

32. The method according to claim 29, wherein a location in the display control cache memory where the display data of the tile is stored is determined and associated with a location of the stored tile in the host cache memory of the remote host device.

33. The method according to claim 29, wherein the display data is stored in compressed form.

34. The method according to claim 28, wherein the match identification includes a location of the stored tile within the display control cache memory.

35. The method according to claim 28, further comprising synchronizing the display control cache memory with the host cache memory at the remote host device.

36. The method according to claim 28, wherein a location in the display control cache memory where the display data of the tile is stored is determined and associated with a location of the stored tile in the host cache memory of the remote host device.

37. The method according to claim 28, wherein the display data is stored in compressed form.

* * * * *